United States Patent
Yang

(10) Patent No.: US 6,646,630 B1
(45) Date of Patent: Nov. 11, 2003

(54) HAND-HELD ELECTRICALLY CONTROLLED DESKTOP STRUCTURE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/455,943

(22) Filed: Dec. 7, 1999

(51) Int. Cl.[7] .................................................. G09G 5/00
(52) U.S. Cl. .......................... 345/156; 248/363; 248/500
(58) Field of Search .................................... 345/156, 157, 345/161, 167; 361/686; 363/37, 38; 248/346.01, 316.1, 118.1, 314, 200, 205.5, 206.2, 500, 363

(56) References Cited

U.S. PATENT DOCUMENTS

| | | | | |
|---|---|---|---|---|
| 4,648,603 A | * | 3/1987 | Hayford, Jr. ............. | 273/148 B |
| 5,011,149 A | * | 4/1991 | Purnell .................... | 273/148 B |
| 5,253,836 A | * | 10/1993 | Tso ........................ | 248/226.11 |
| 5,727,188 A | * | 3/1998 | Hayes ..................... | 703/8 |
| 6,119,991 A | * | 9/2000 | Thorne et al. ........... | 248/229.2 |
| 6,366,274 B1 | * | 4/2002 | Elledge .................... | 345/163 |
| 6,378,826 B1 | * | 4/2002 | Knaub et al. ........... | 248/229.21 |

* cited by examiner

Primary Examiner—Kent Chang
(74) Attorney, Agent, or Firm—Bacon & Thomas, PLLC

(57) ABSTRACT

A hand-held electrically controlled desktop structure. The device includes a chassis for coupling with the desktop, an integration device for separable integration with the hand-held electric control, and a supporting device having a rigid or resilient base that provides support to and join the hand-held electric control with the chassis. The chassis can be a suction disk, laydown, or locker type. The integration device can be a fixed unit or separable unit; it can be adapted for integrated hanging, coupling, lay-in, folding, clamping, magnetic absorption, or it may include a sticker lacing assembly. The supporting device can be a rigid structure, articulation assembly or spring-bound electric structure or a resilient structure.

4 Claims, 39 Drawing Sheets

HAND-HELD ELECTRICALLY CONTROLLED DESKTOP STRUCTURE

BACKGROUND OF THE INVENTION

1. Field of the Invention

A hand-held electrically controlled Desktop Structure, including: (1) a chassis for integration with a desktop; (2) a liaison device adapted for separable coupling with a hand-held electrical control; and (3) rigid or flexible supports to support and facilitate coupling between the hand-held electrical control and the chassis.

2. Description of the Related Art

Conventional hand-held electric control devices, such as a computer key-in device, palm-held video games, palm-held electronic counters or other palm-held man/machine interface electric controls, the shell casing is invariably of a design that requires the user's hand to hold on to the casing. Applicant disclosed in an earlier application (U.S. Ser. No. 09/033,596) a holding ring type hand control device. Such a Holding Ring Type Hand Control includes essentially one or more ring snap finger holes transversely across a mini electric control casing, complete with main control slue ball serving to produce digital or analogue signals mounted outside the casing and relevant control pushkeys, plus selectable interfaces which are optional per functional requirements, including switches or display lamps or screens, or projection sources or speaker or counter, such that one or more of these optional interfaces may interact with the digital or analogue signals produced by the main control slue ball and the display, or alternatively with the control switches, whereas internal cell and electric/electronic circuits or relevant software may be electively equipped per functional needs to constitute functional circuits which in coordination with the digital or analog signals produced by the main control slue ball may serve to relatively drive, control the target so that the holding type hand control may serve the functions for which it is designed.

Such a holding type control generally complies with ergonomic principles, and it is convenient for use, and functionally effective however, its shell casing is so delicate, and rolls upon a slight touch, and could easily roll off the desktop, resulting in damage. In considering the manner of use of such holding type control, including occasional laying on a desktop where it needs be, improvements are required.

SUMMARY OF THE INVENTION

The primary object of the invention, therefore, lies in the design of a hand-held electrically controlled desktop structure which makes possible random disposition of a hand-held electric control onto a desktop without it being easily rolled away and damaged, and which adds to the convenience of desktop manipulation altogether. Structurally the invention includes: (1) a chassis for integration with the desktop; (2) a liaison device for separable integration with a hand-held electric control; and (3) rigid or flexible supports to support and facilitate coupling between the hand-held electric control and the chassis.

A further object of the invention lies in the provision of a chassis in the desk-relevant structural design of a hand-held electric control, means for integration with the desktop, which can be a suction disk type, lay-on type or lock type.

A further object of the invention lies in the provision of a hand-held electrically controlled desktop structure, with means for coupling with the hand-held electric control that may be of a fixed type or separable type, whether it is positioned by hanging, coupling, via an adaptor, attachment, a folder, slip-in, magnetic suction, lacing bonding or by similar execution.

A further object of the invention lies in the provision of a hand-held electrically controlled desktop structure, whereof the hand-held electric control and the chassis support and flexible supports for liaison purposes may be executed in a rigid structure or an articulated structure, a resilient structure, or by employing flexible materials for assembly.

A further object of the invention lies in the provision of a hand-held electrically controlled desktop structure, whereof the rigid supports serve to support and liaison with the hand-held electric control, and chassis may be executed in rigid form, complete with an arm hook.

DETAILED DESCRIPTION OF THE PREFERRED EMBODIMENTS

Other features, characteristics, functions and objects of the invention will be described with reference to the accompanying drawings, in further detail.

Referring to the accompanying drawings, altogether, it will be seen that the inventive design of a Hand-held Electrically Controlled Desktop Structure comprises essentially:

A chassis 1 for integration with the desktop;

Liaison means or device for integration with the hand-held electric control;

A support that is rigid or flexible, to support and facilitate coupling between the hand-held electric control and the chassis; whereby the hand-held electric control 4 may be securely disposed at random on the desktop, thus enhancing the convenience of desktop manipulations;

Chassis 1, to be integrated with the desktop, may be executed in the form of a suction disk, laydown-type installation or locker-type installation;

The liaison means or device, to be separately attached to by the hand-held electric control 4 for fixed coupling or detaching. The liaison device can be held in place by hanging, coupling intromission, folder, clip-on or magnetic suction;

The support, inherently rigid or flexible, to support and facilitate coupling between the hand-held electric control 4 and chassis 1, and may be executed in rigid, articulated, spring bound resilient or flexible based structures;

A hand-held electric control unit, as a desktop structure, is defined accordingly and is laid out with the chassis I suitably mounted on the desktop, such that, the liaison means is united with the hand-held electric control 4, and the support is manipulated to bring the hand-held electric control 4 to be combined with the chassis 1, whereby a reinforced support is realized, so that the hand-held electric control 4 may retain full stability in place anywhere on the desktop, with ease of manipulation on the desktop and is an added advantage which is realized thereby.

Figure 1:
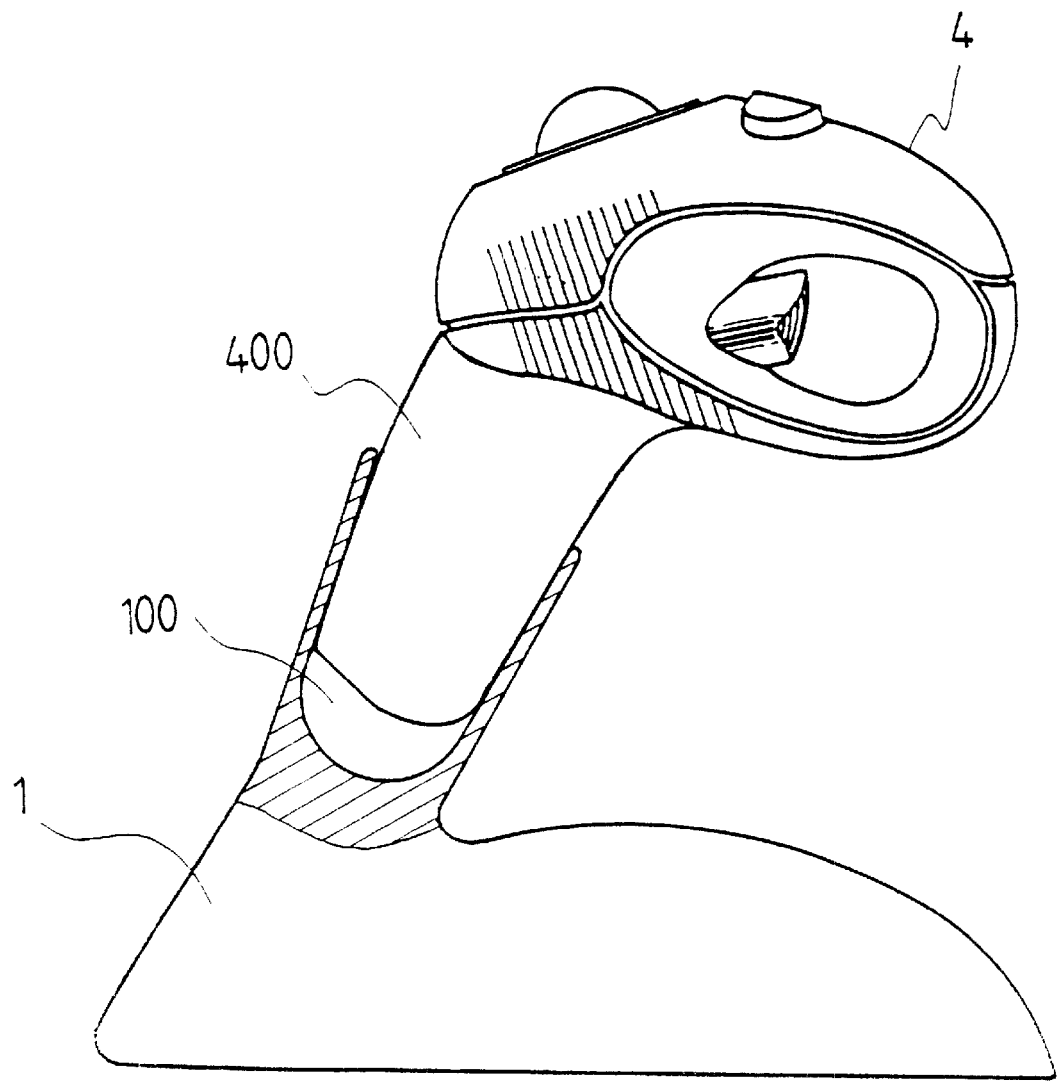
FIG. 1 illustrates a first embodiment of the invention whereof the chassis is a rigid or flexible structure and equipped with an access hole on its top to facilitate fitting of the hand-held electric control.
Figure 2:
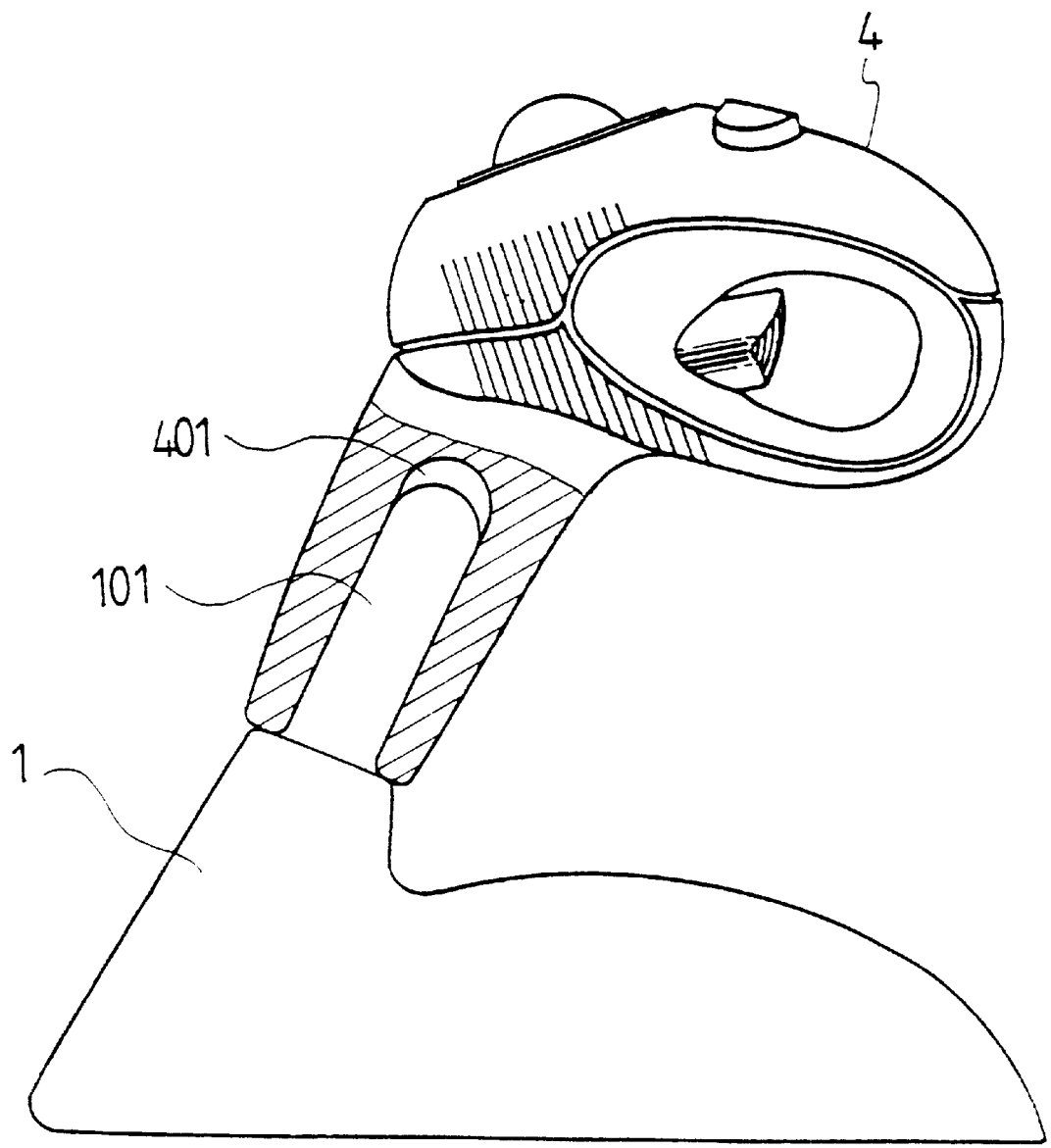
FIG. 2 illustrates a second embodiment of the invention whereof the chassis is a rigid or flexible structure and is equipped with an access lug on its top to facilitate fitting of the hand-held electric control.
Figure 3:
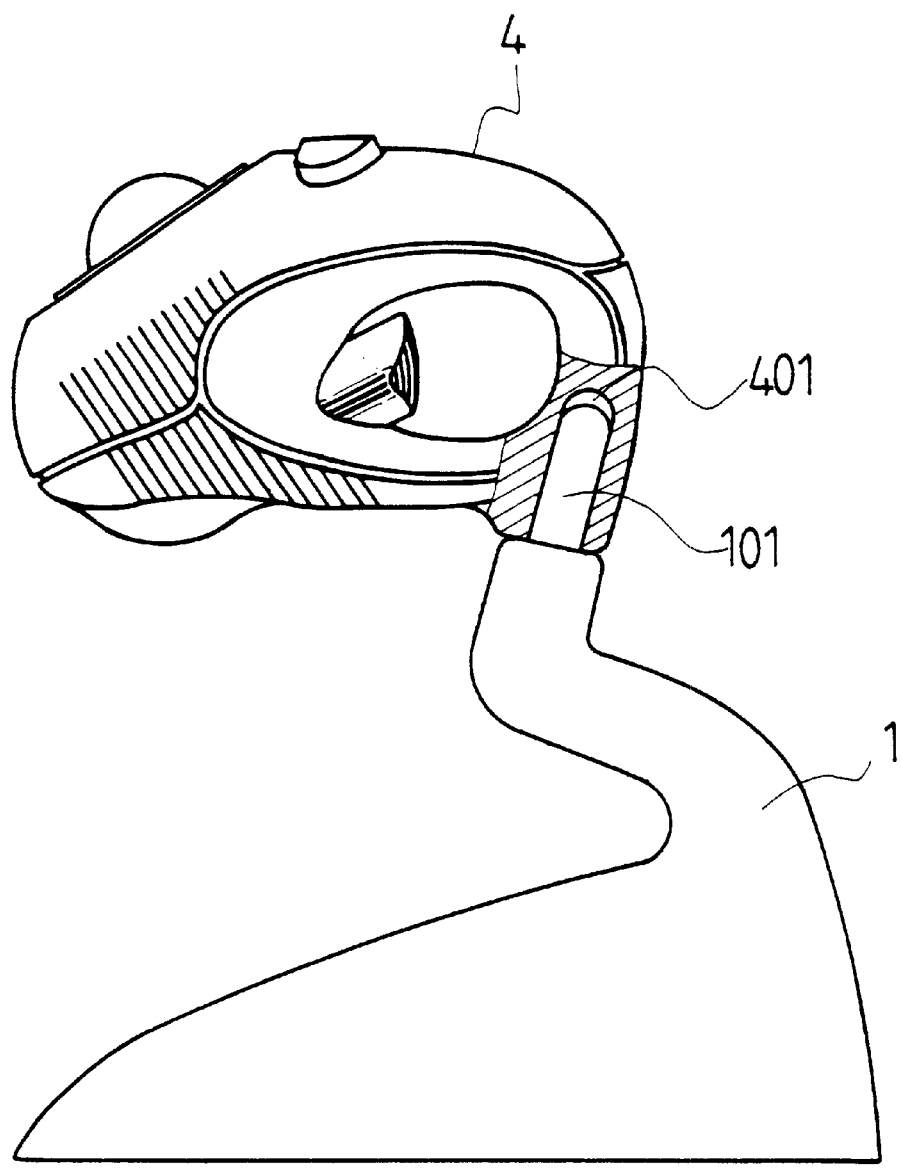
FIG. 3 illustrates another embodiment of the invention whereof the chassis is a rigid or flexible structure and equipped with an access lug on its top to facilitate fitting of the hand-held electric control.

As shown in FIG. 1, the chassis 1, of rigid or resilient structure, has an access hole 100 on an opening end thereof, to facilitate insertion of the handle 400 that is part of the hand-held electric control 4. Alternatively, as shown in FIG. 2, FIG. 3, the access hole 100 may be replaced by an insert stem 101 for attachment with an insert hole 401 on the handle 400 relative to the hand-held electric control 4, or on the casing wherever appropriate so that the insert hole 401 may securely accommodate the engagement of the insert stem 101.

Figure 4:
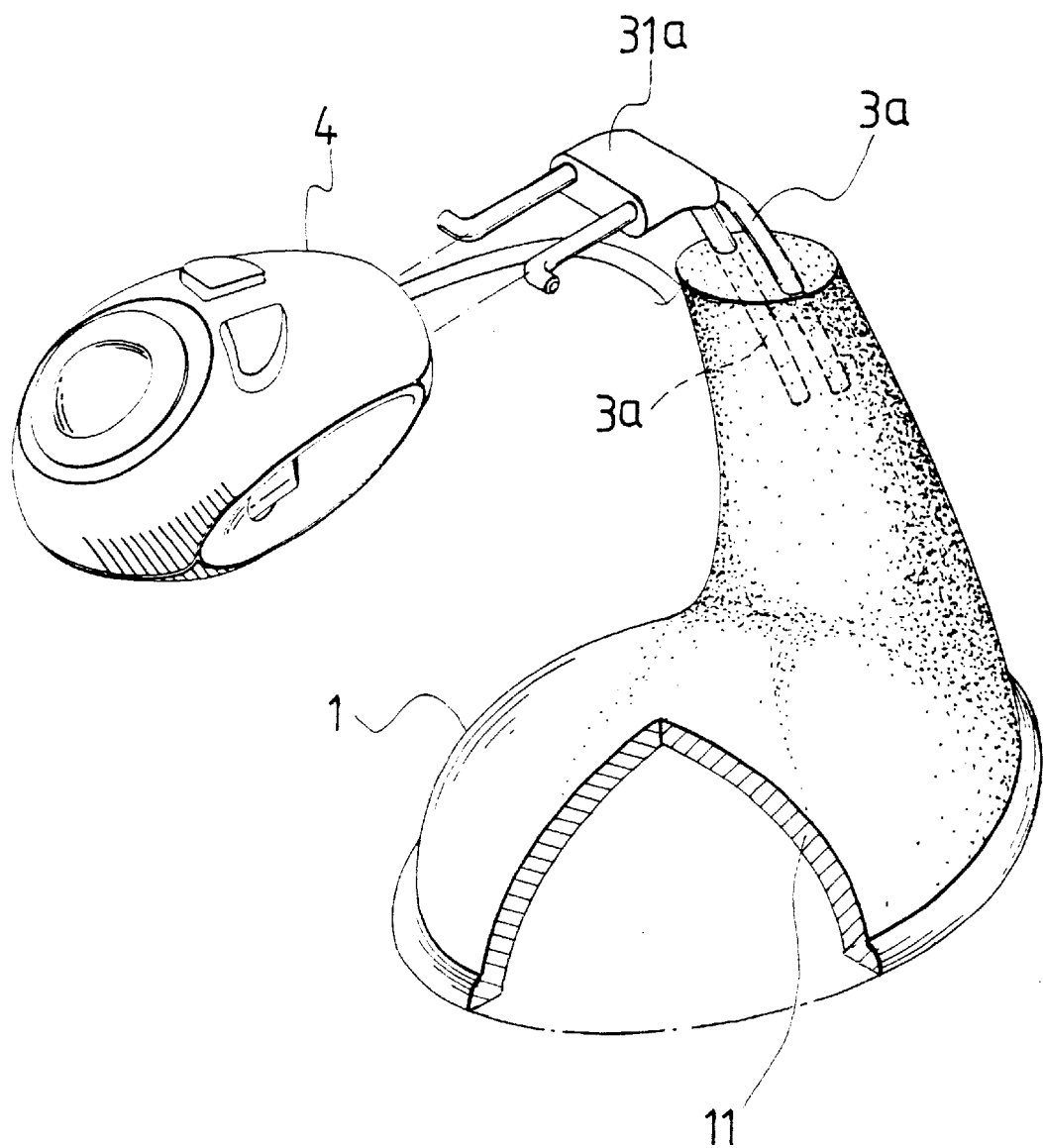
FIG. 4 illustrates a first embodiment of the invention whereof the chassis is equipped with a suction disk on its bottom.
Figure 9:
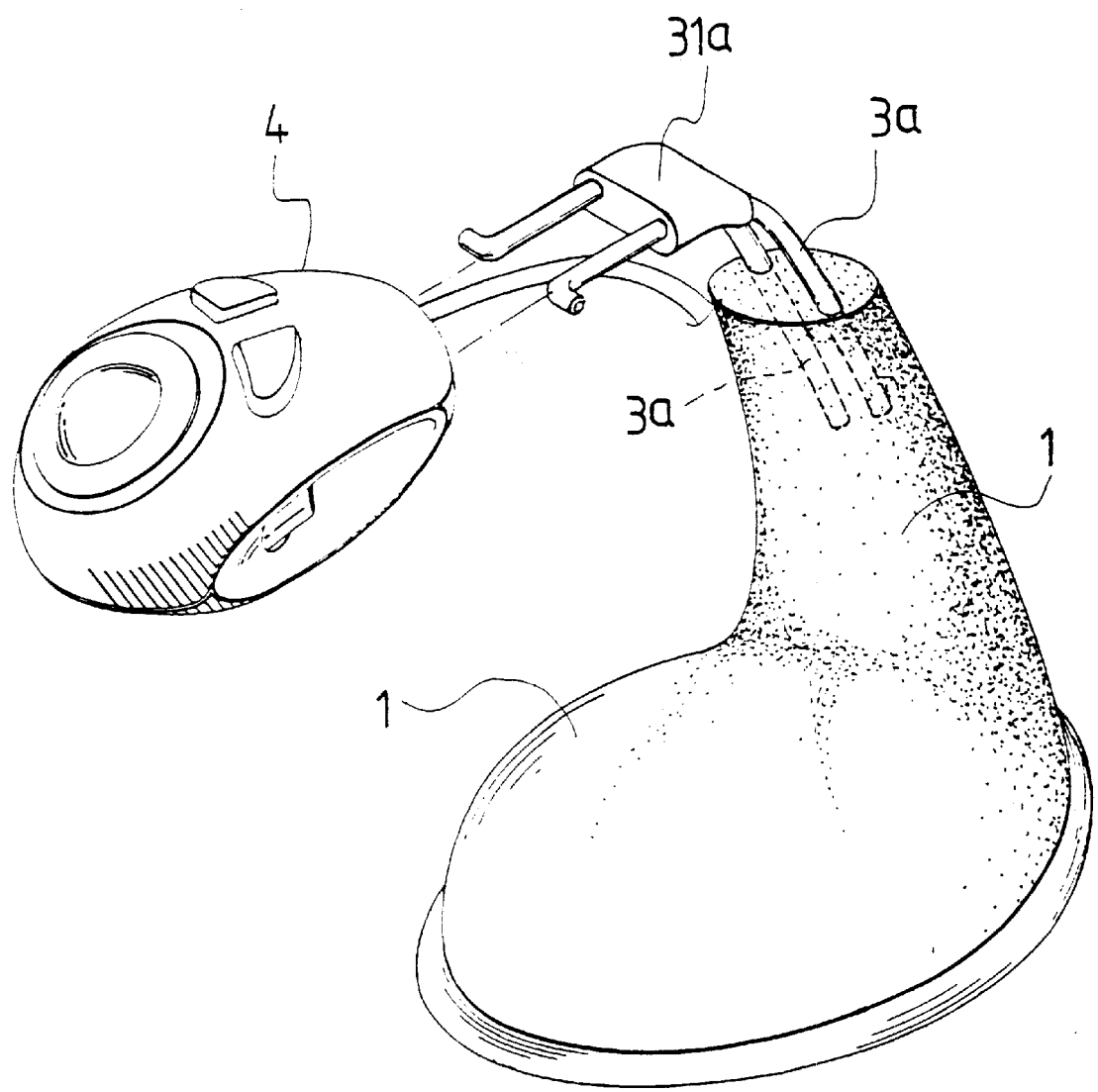
FIG. 9 illustrates a second embodiment of the invention whereof the chassis is made of a rigid base or flexible base material.
Figure 10:
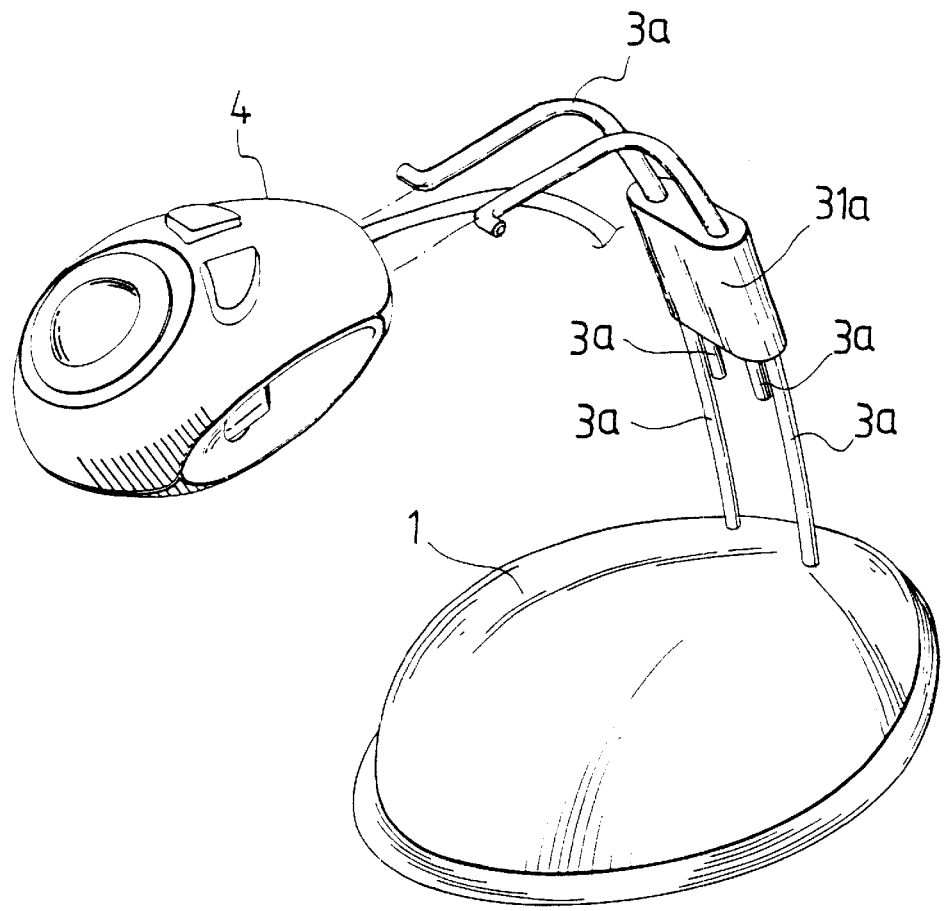
FIG. 10 illustrates, in a three-dimension setting, the support with a contractable pillar structured according to the invention.
Figure 11:
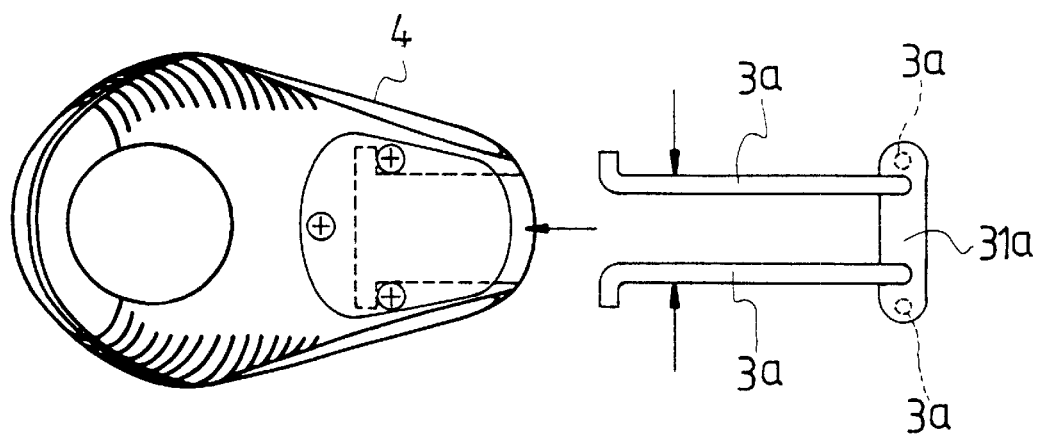
FIG. 11 is a plane view of what is shown in FIG. 10.
Figure 12:
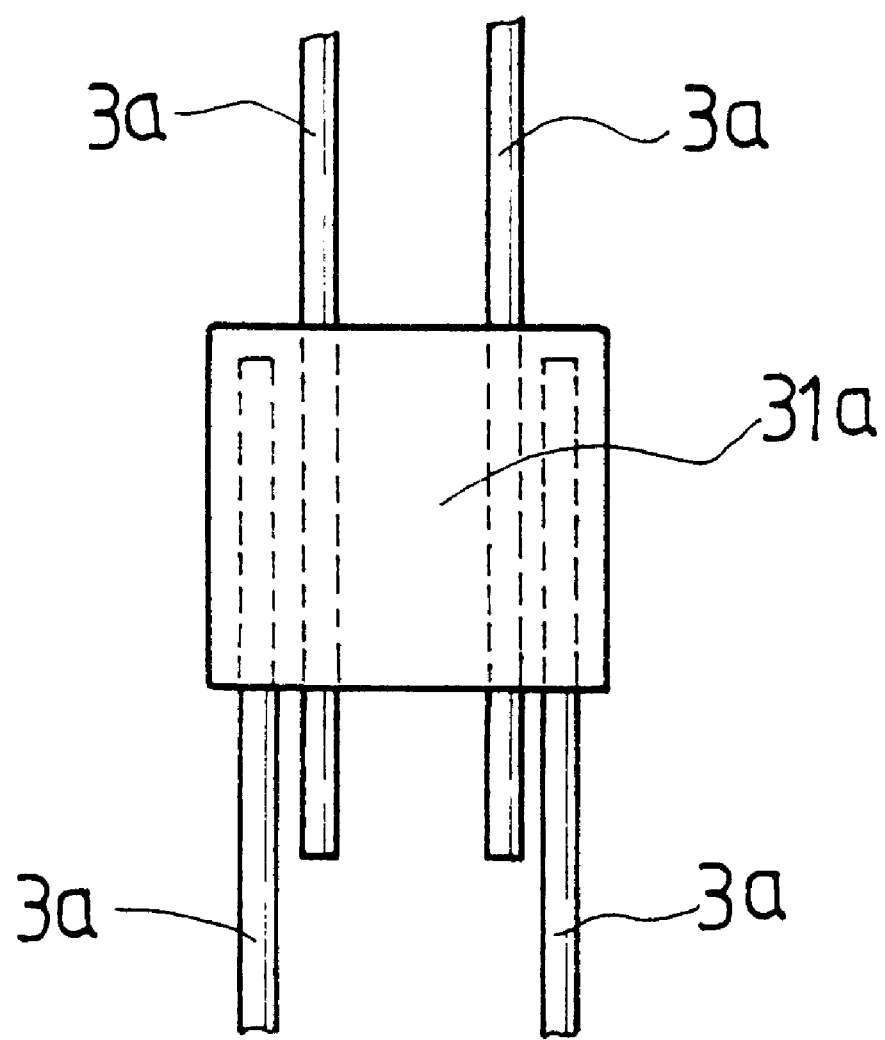
FIG. 12 shows how the flexible pillar as illustrated in FIG. 10 can be contracted or extended in the chassis.
Figure 13:
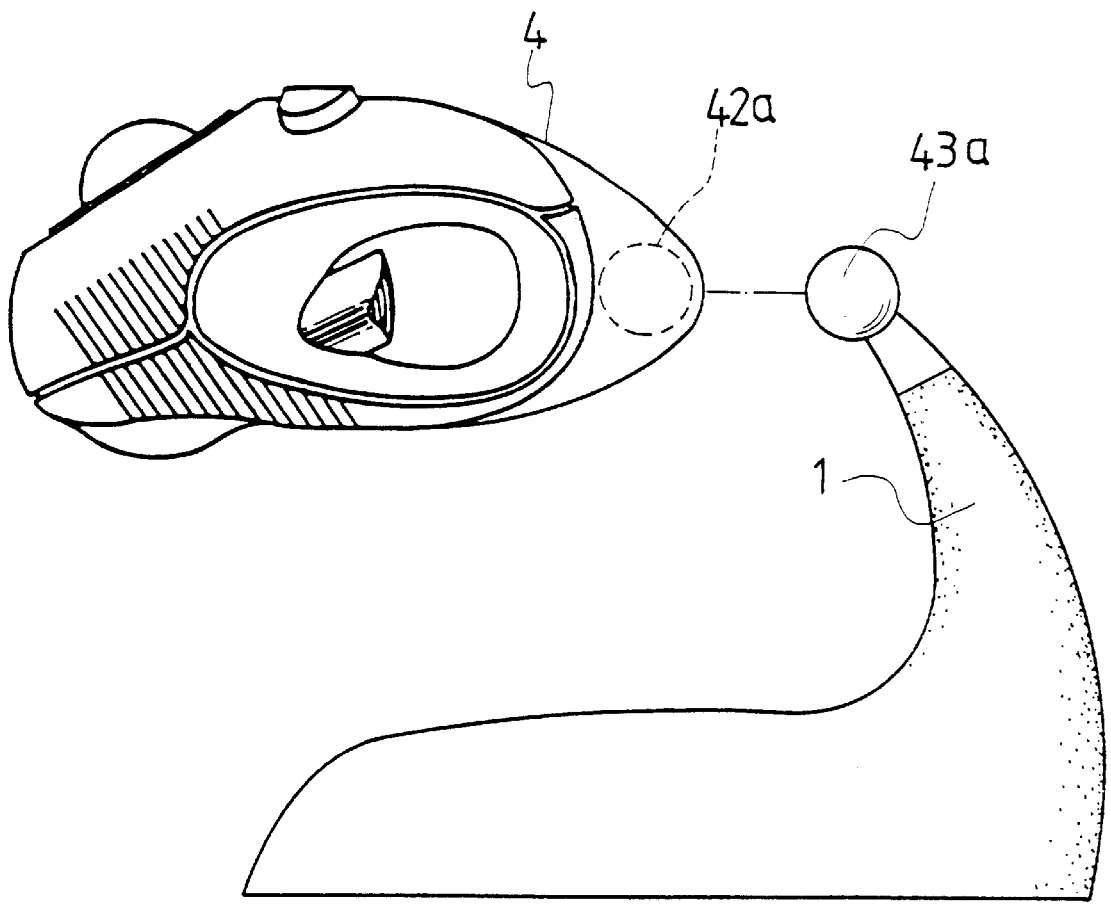
FIG. 13 shows a third embodiment whereof the chassis includes a combination of rigid and flexible materials.

As shown in FIG. 4, the chassis 1 has one or more suction disks 11 installed on the bottom and the suction disks 11 may be attached to anywhere appropriate, most preferably onto a smooth desktop or glass sheet or computer display or shell casing. The chassis 1 may be made from either rigid or resilient materials or both, as in FIG. 15, or in combination of both materials, as indicated in FIG. 13. The idea is for the layout to be stable and securely positioned, or alternatively the chassis 1 may be locked to a suitable substrate which is typically a desktop. The support for the chassis 1 can be in the form of one or more resilient pillars 3a, such as, for example, the metal columns illustrated in FIG. 9, between both of the resilient columns or pillars 3a, it is admissible to interpose an adjustable sleeving 31a in which the resilient columns 3a may protract and retract upon the urging of the user, as illustrated by FIGS. 10–12.

Figure 5:
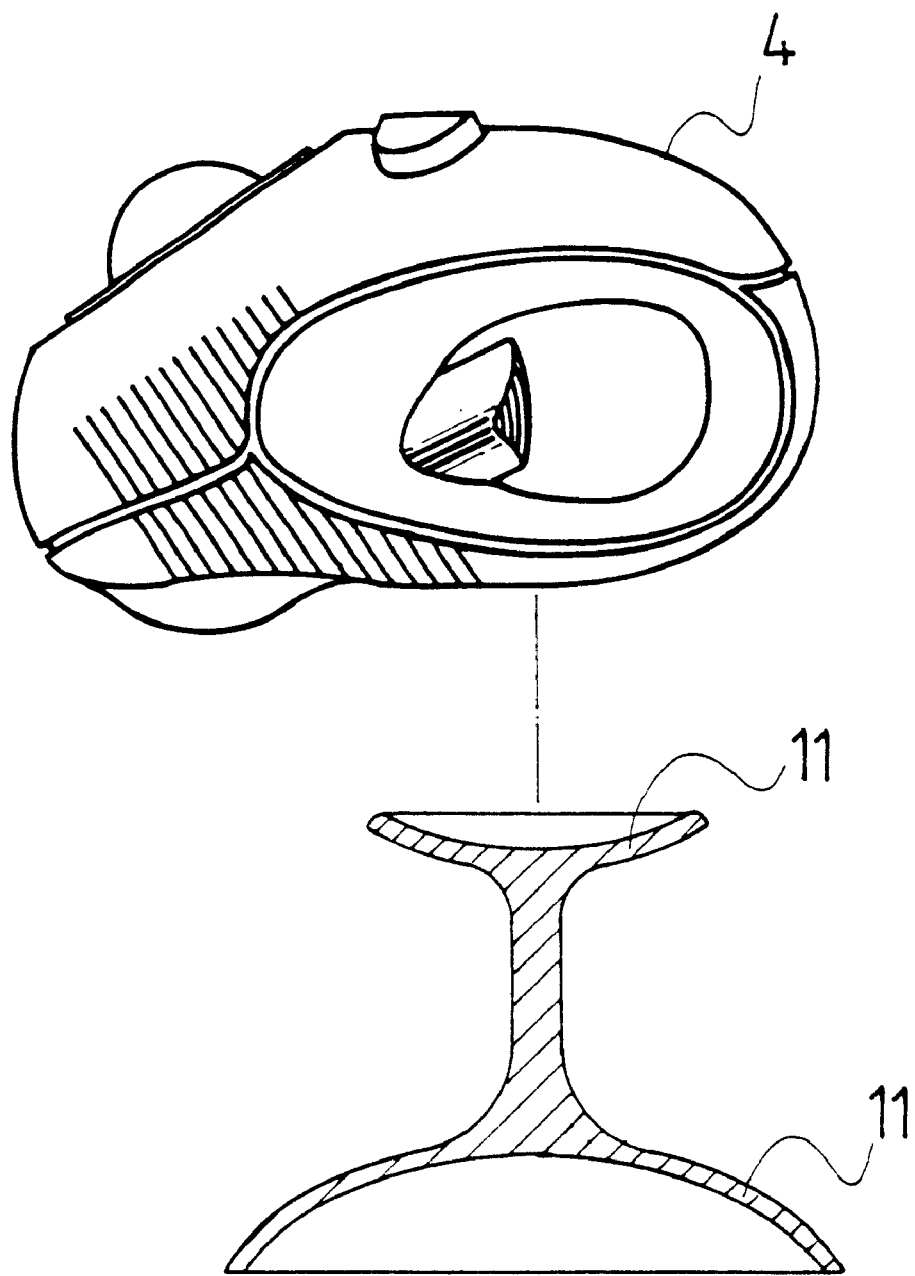
FIG. 5 illustrates the use of a suction disk with the second embodiment of the invention.
Figure 6:
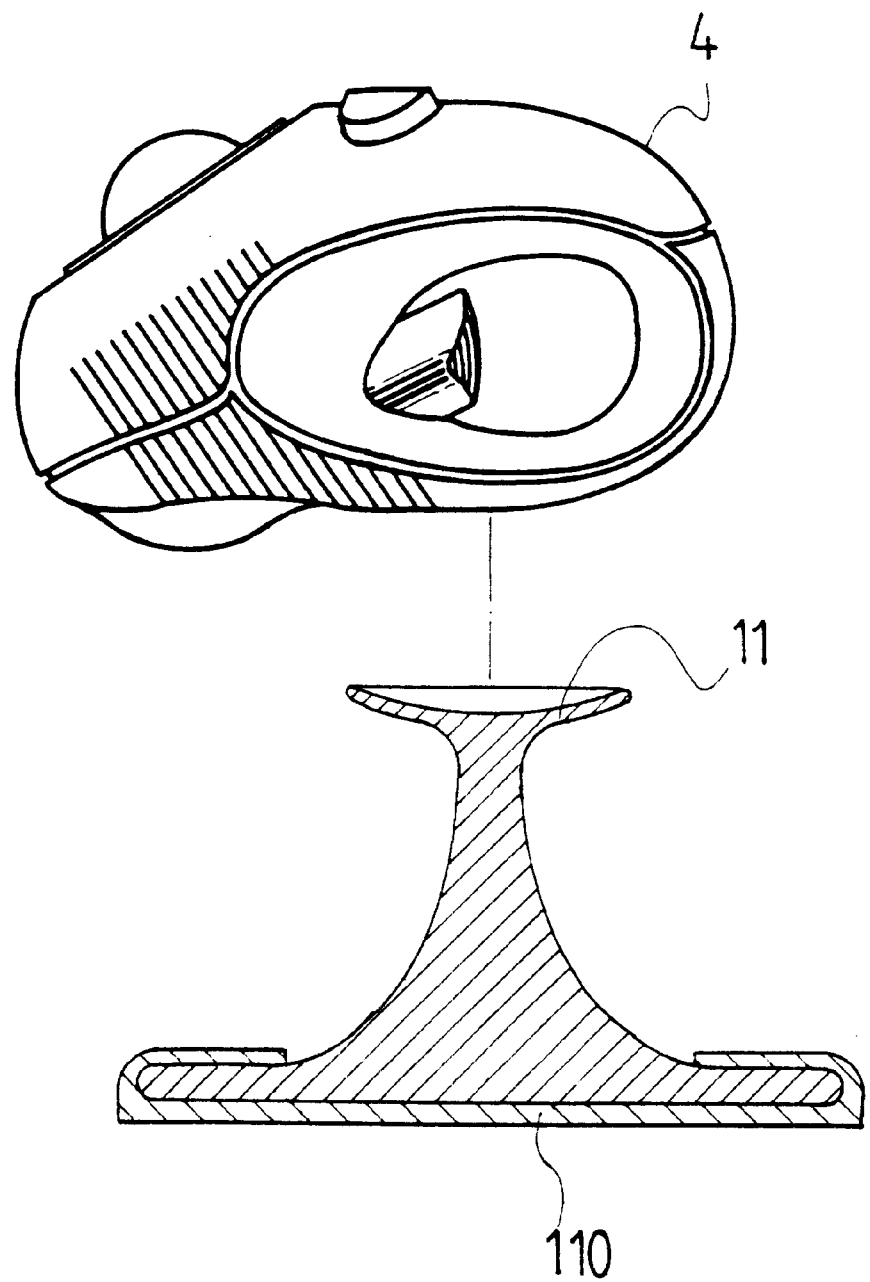
FIG. 6 illustrates the use of a suction disk with a third embodiment of the invention.
Figure 7:
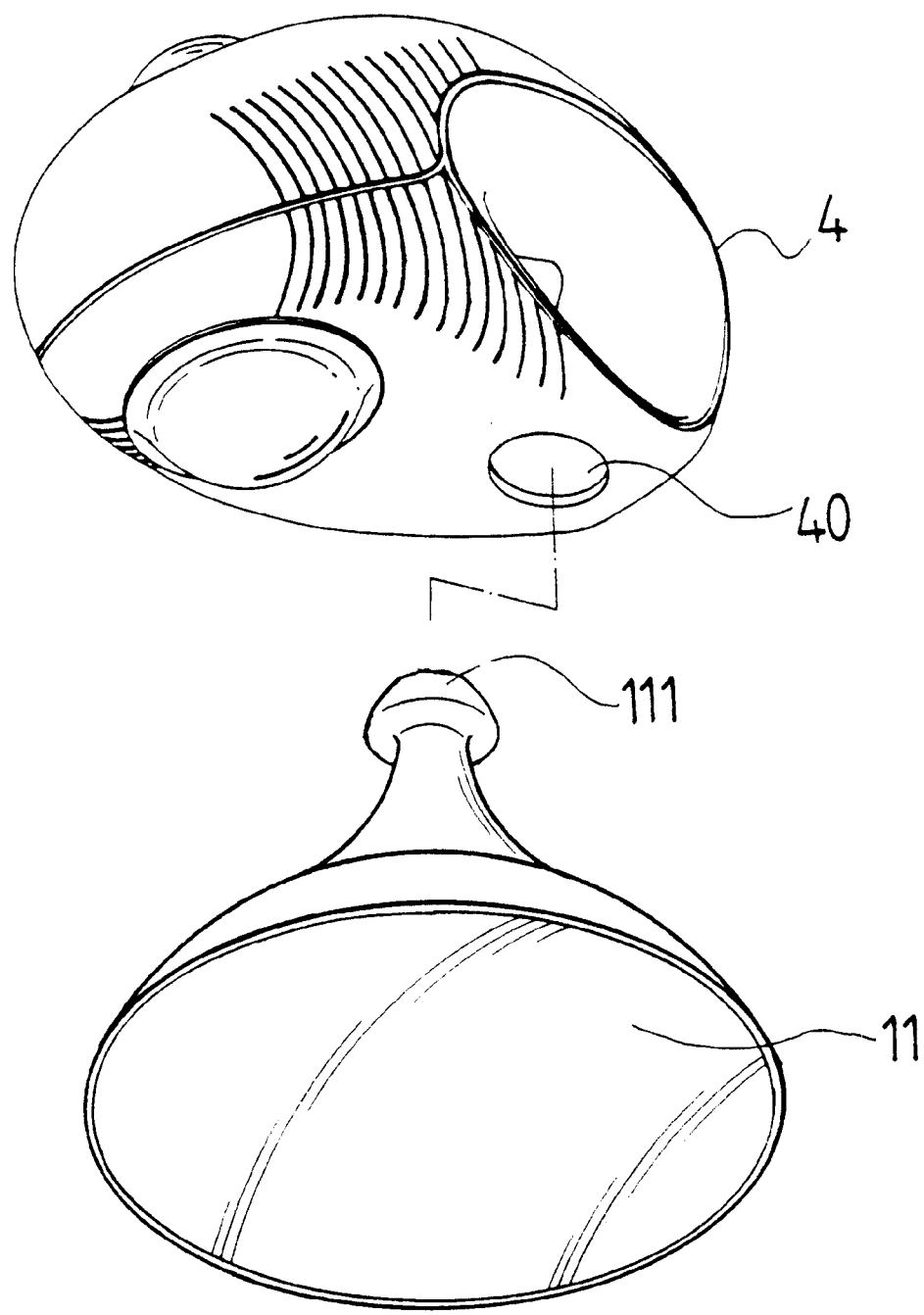
FIG. 7 illustrates the use of a suction disk with a fourth embodiment of the invention.
Figure 8:
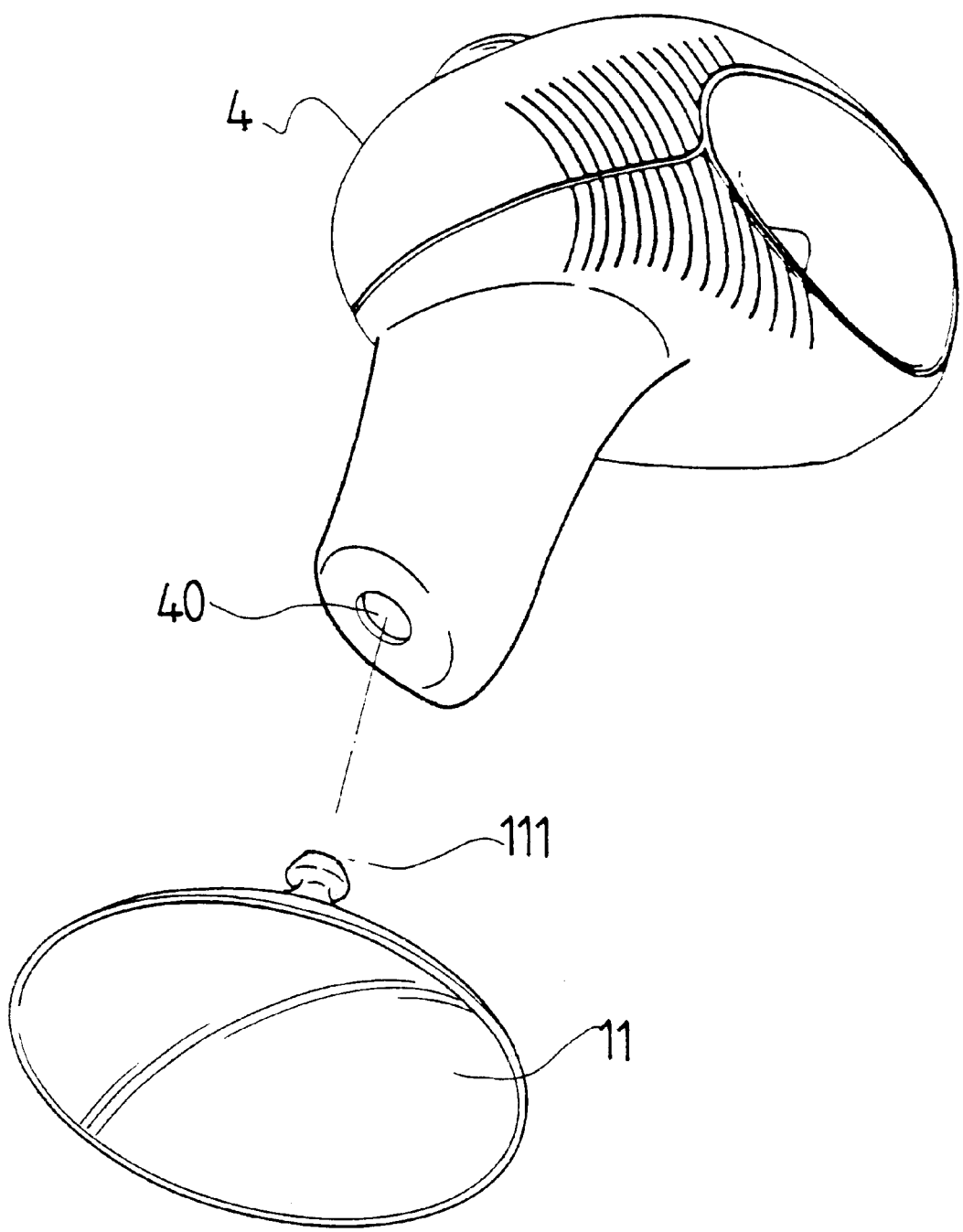
FIG. 8 illustrates the use of a suction disk with a fifth embodiment of the invention.

As shown in FIG. 5, the casing that is composed of one pair of suction disk 11 is laid in an up/down layout, and is structured so that the upper suction disk is absorbed by the hand-held electric control 4, and the lower suction disk is stuck onto the desktop or computer outer casing or display scree. Similarly, as shown in FIG. 6, the structural logic may be such that while a suction disk 11 is arranged on top, the under side may be wrapped using rigid materials 110, then laid on the desktop, alternatively as illustrated in FIG. 7 and FIG. 8, on top of the coupling adaptor 111 of the suction disk 11 to facilitate direct attachment with the hand-held electric control 4, or a corresponding coupling hole 40 may be provided on the hand-held electric control 4 for friction coupling therewith.

Figure 14:
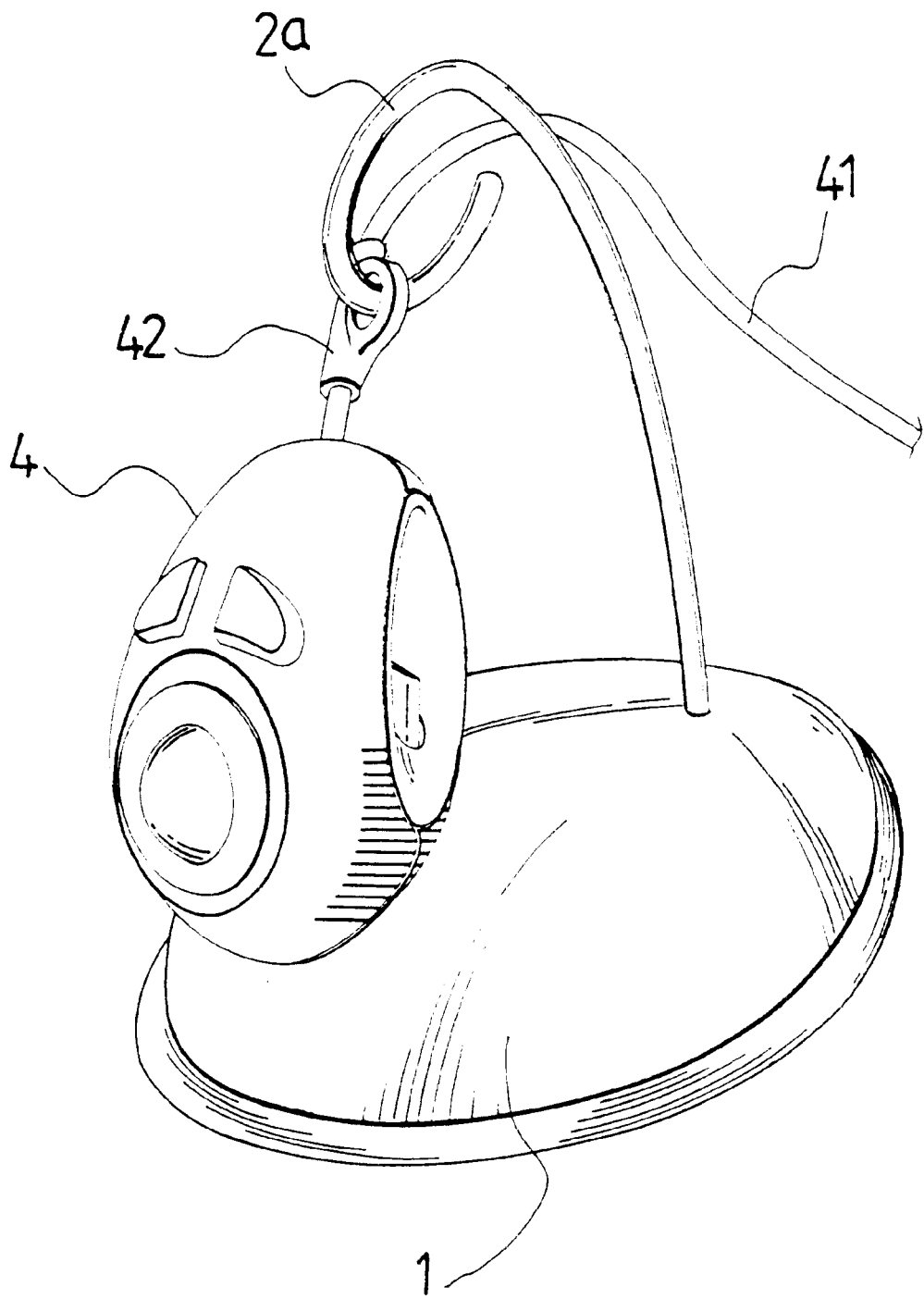
FIG. 14 shows a first embodiment in which the liaison mechanism is a hanging-type.
Figure 15:
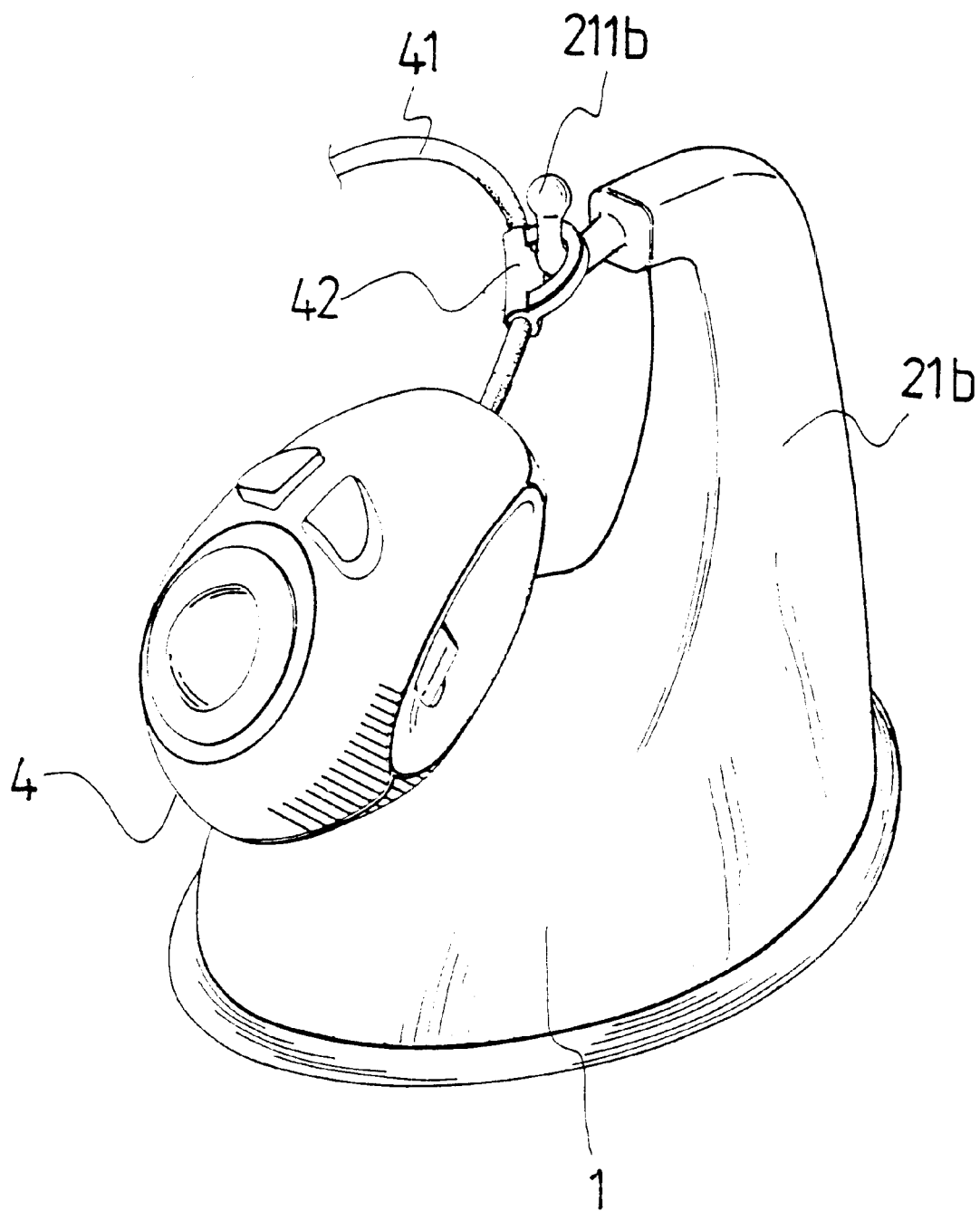
FIG. 15 shows a second embodiment in which the liaison mechanism is a hanging-type.

As shown in FIG. 14, the liaison means or device as afore-mentioned may also be of a hanging type executed with one or more hooking elements 2a installed on a predetermined location on the chassis 1, and to the hand-held electric control 4, a ring 42 may be attached on the casing or, by sleeving, to the transmission wire 41, so that the hand-held electric control 4 may retain its position by having the ring 42 hung on the hooking element 2a. Also, as shown in FIG. 15, a protrusion 21b is formed on the chassis 1, where the protrusion 21 b sets there may be installed one or more hooking elements 211b.

Figure 16:
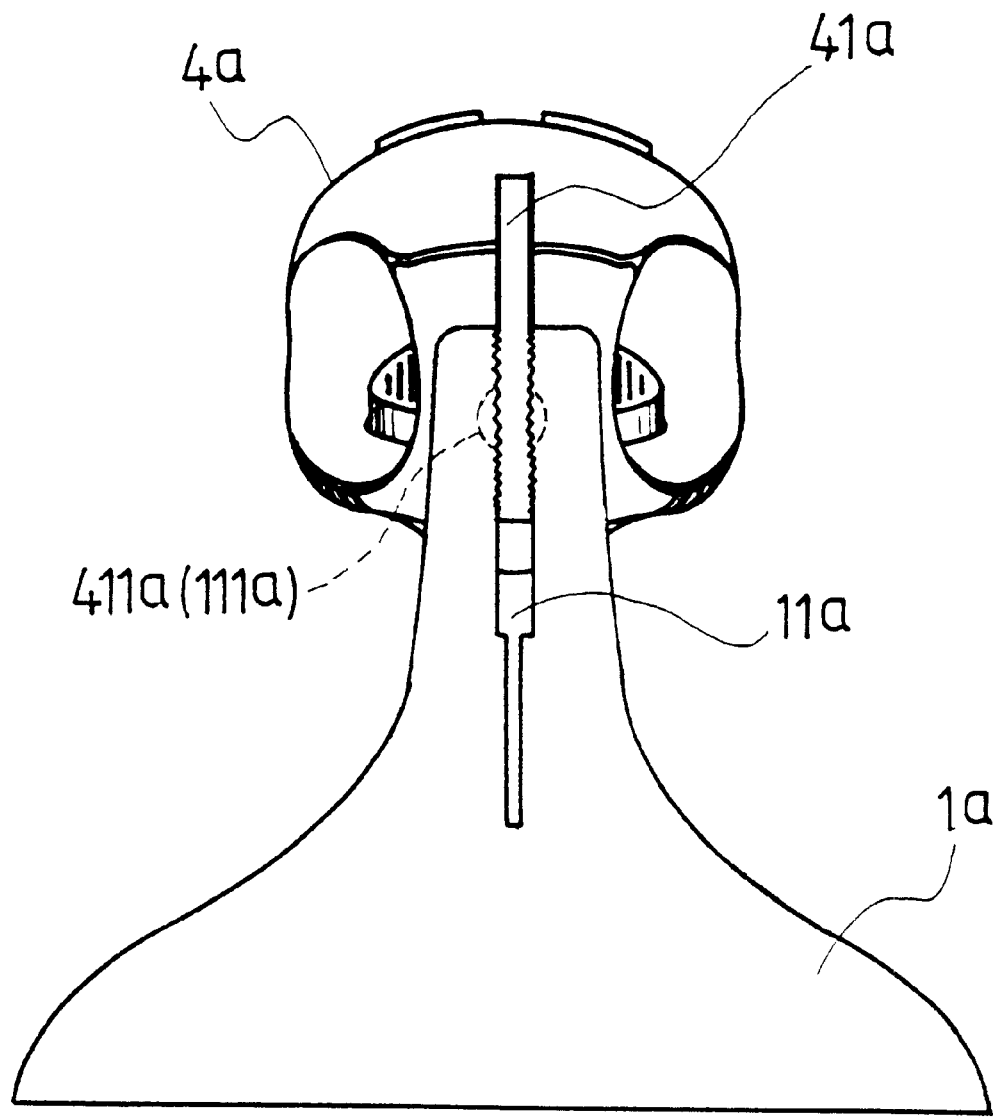
FIG. 16 is a side view of a first embodiment in which the liaison mechanism is a coupling-type.
Figure 17:
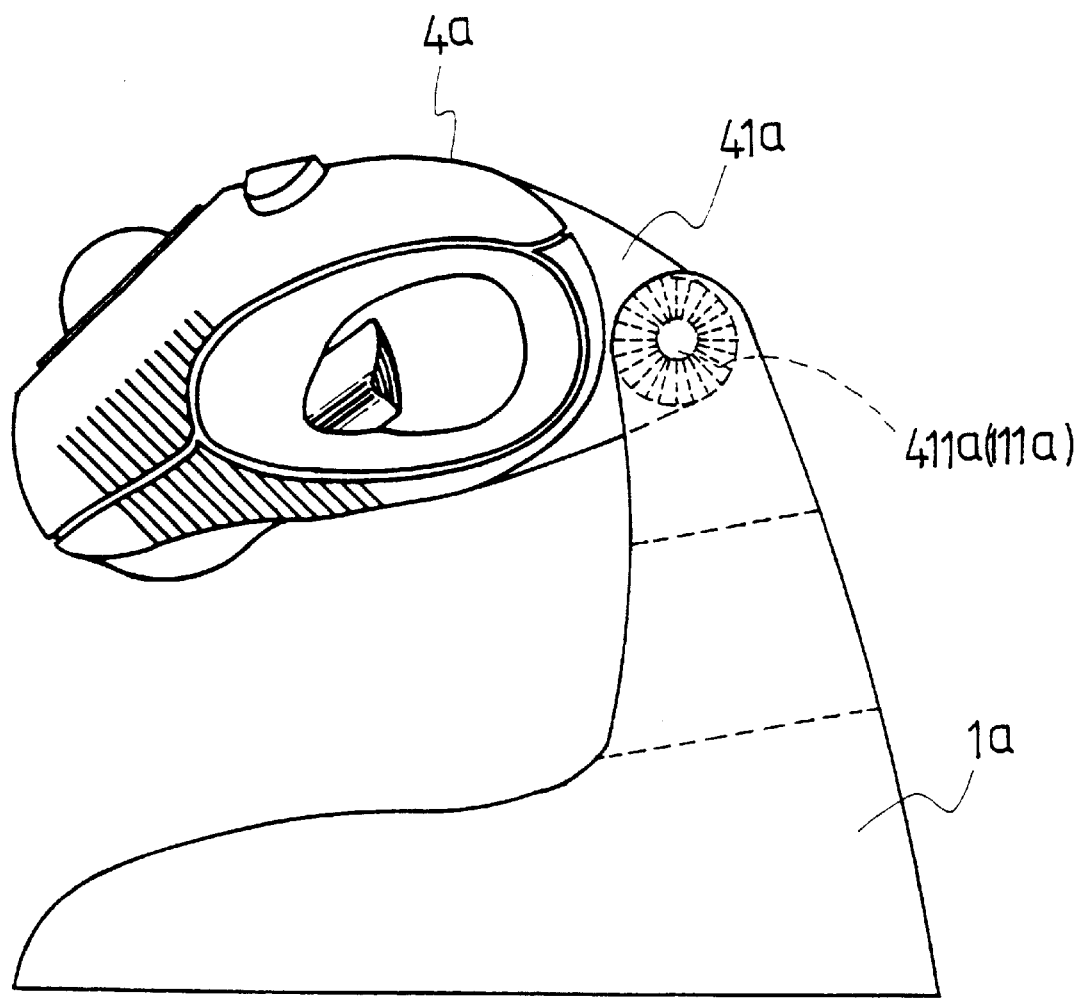
FIG. 17 is a side view taken from a different angle of the embodiment illustrated in FIG. 16.

As shown in FIG. 16, FIG. 17, where the liaison means is executed in the form of a coupling, it is preferable to have a resilient coulisse 11a provided in the chassis 1a, and also to have an extension board 41a provided outside the casing of the hand-held electric control 4a. The extension board 41a and the resilient coulisse 11a are counterbalanced with corresponding movable snap elements 411a and 111a on chosen locations so that the hand-held electric control 4a may form a union with movable engagement with the chassis 1a. Similarly, as shown in FIG. 18, with regard to the union with movable engagement, the resilient coulisse 11b provided in the chassis 1b may incorporate built-in retention springs 111c and corresponding ball beads 111b so that an adjustable articulation is produced once insertion is made with the extension board 41a as related to the hand-held electric control 4a.

Figure 18:
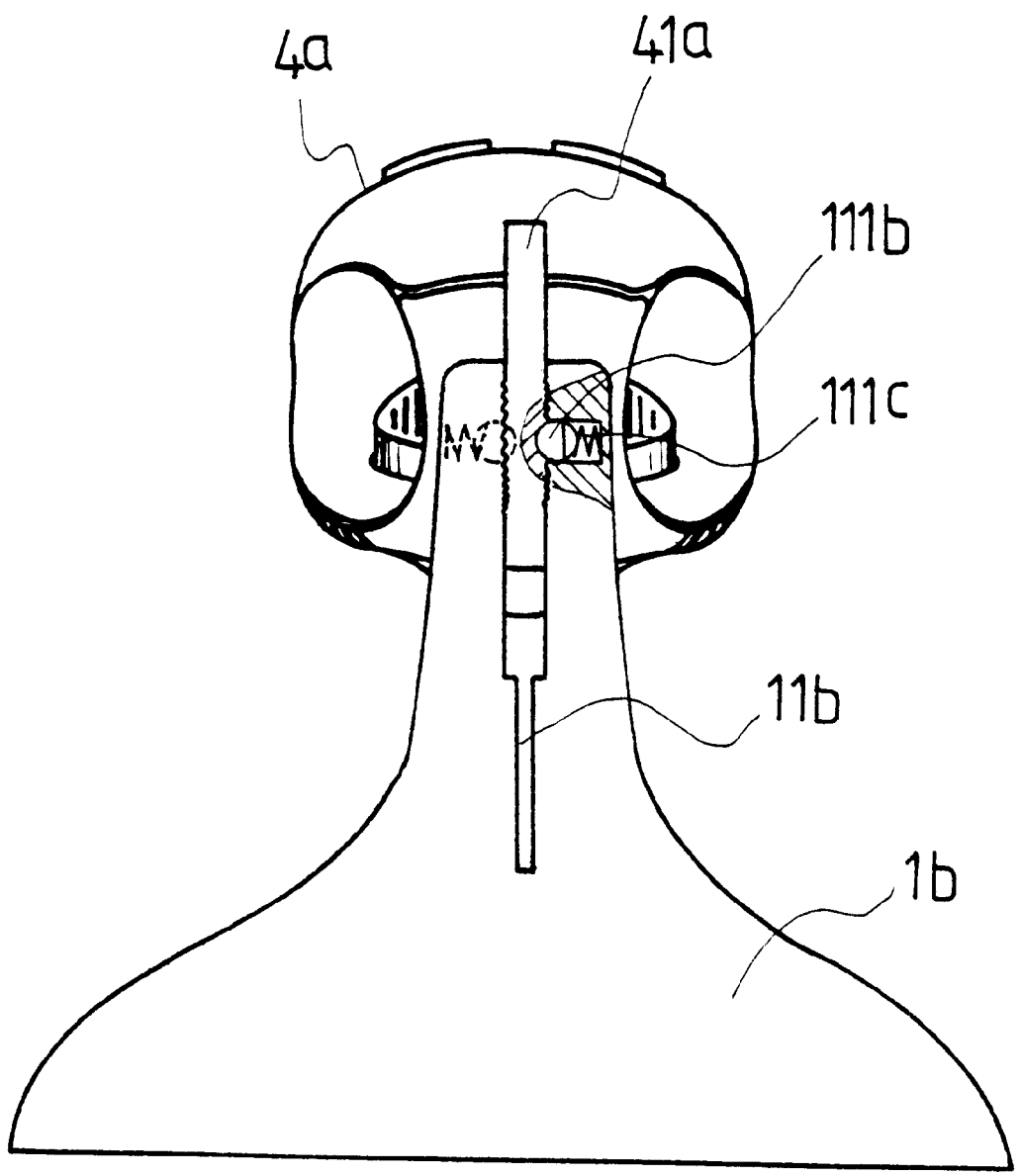
FIG. 18 is a second embodiment in which the liaison mechanism is a coupling-type.

As shown in FIG. 16 through FIG. 18, the interactive engagement between the extension board 41a, as part of the hand-held electric control 4a and the resilient coulisse 11a is assisted by the serrations present on the respective contact surfaces so as to achieve simultaneous swinging and positioning effects.

Figure 19:
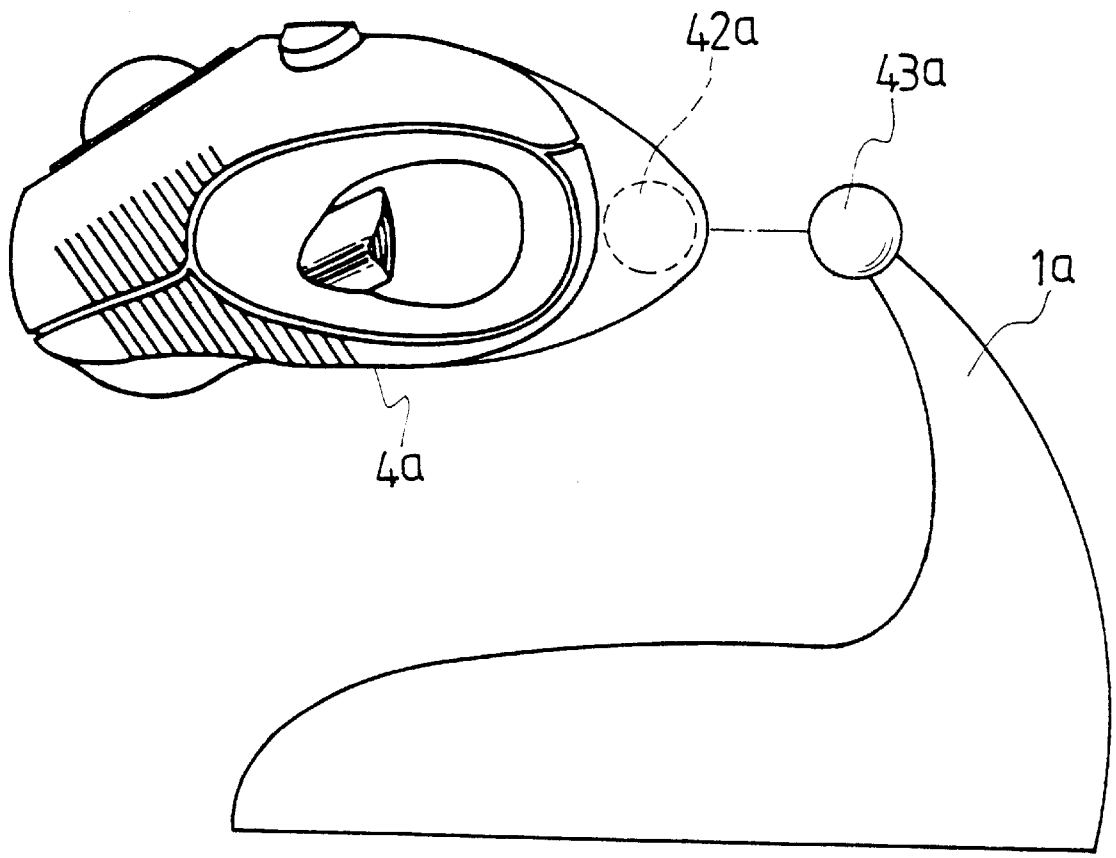
FIG. 19 is a third embodiment in which the liaison mechanism is a coupling-type.
Figure 20:
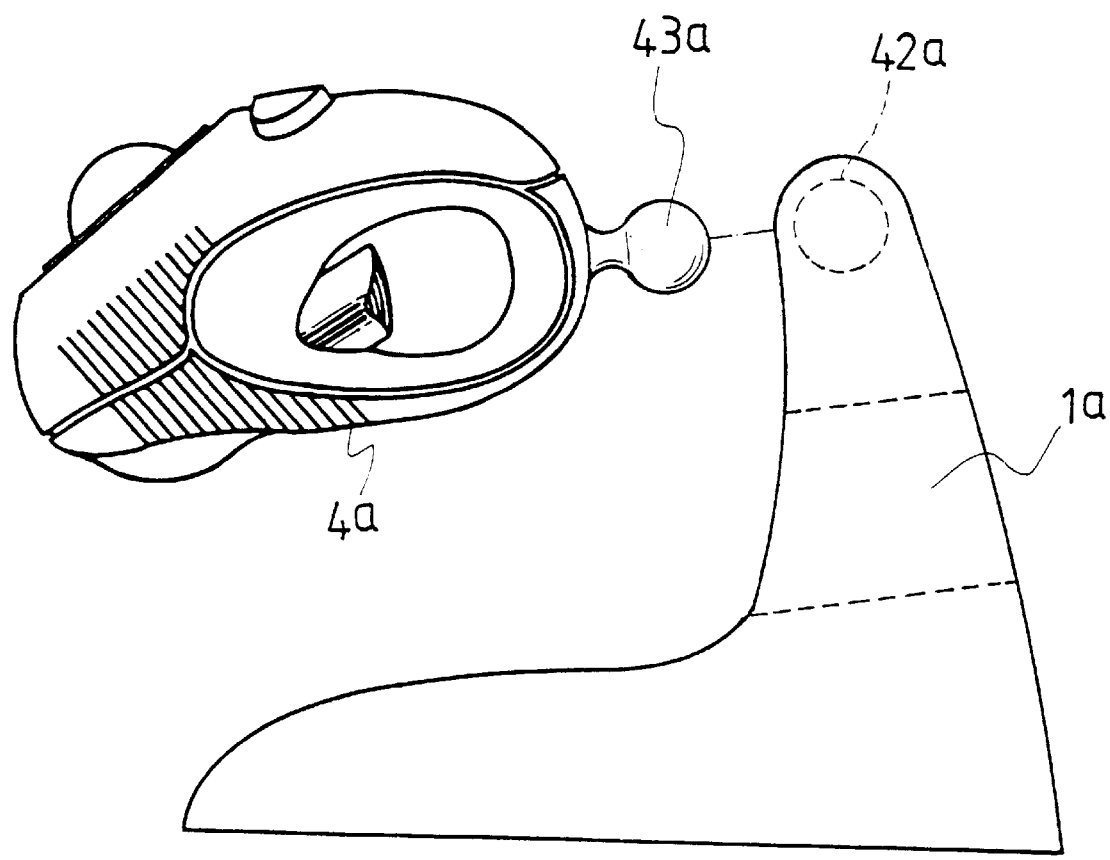
FIG. 20 is a fourth embodiment in which the liaison mechanism is a coupling-type.
Figure 21:
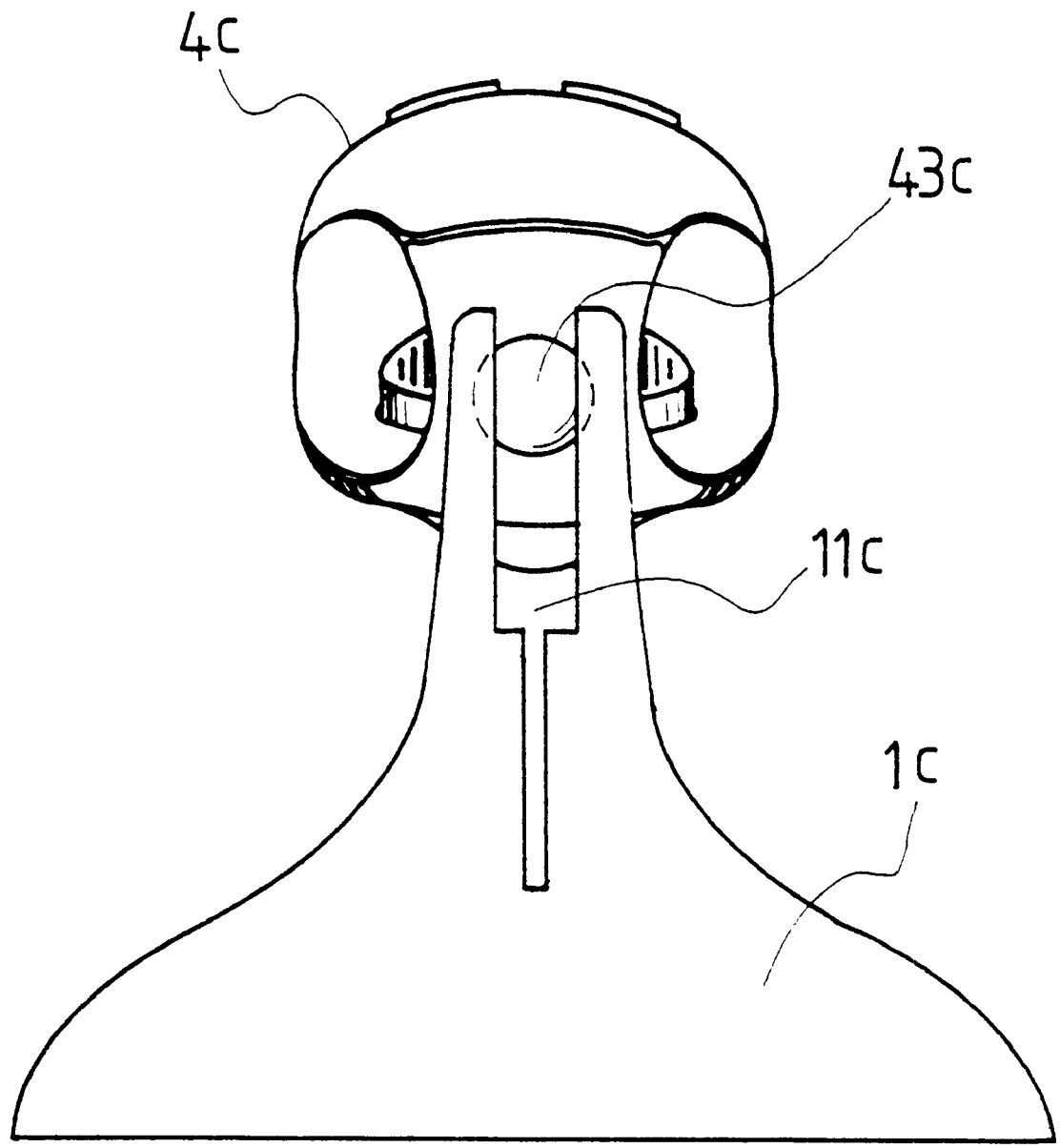
FIG. 21 is a fifth embodiment in which the liaison mechanism is a coupling-type.
Figure 22:
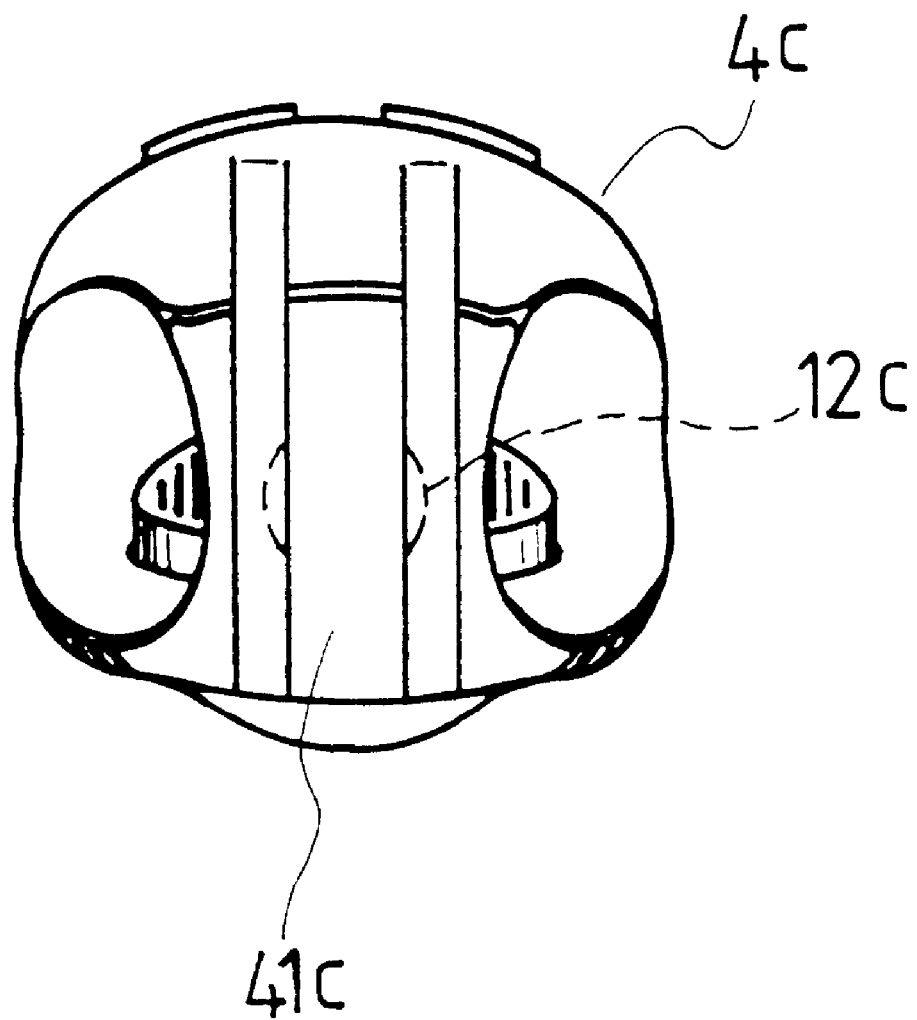
FIG. 22 is a sixth embodiment in which the liaison mechanism is a coupling-type.
Figure 23:
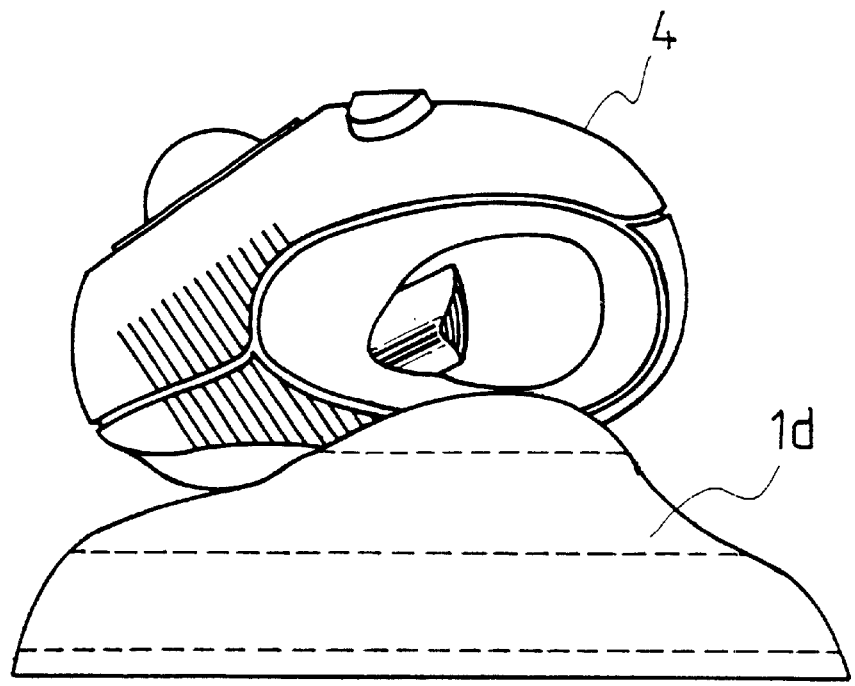
FIG. 23 is a seventh embodiment in which the liaison mechanism is a coupling-type.
Figure 24:
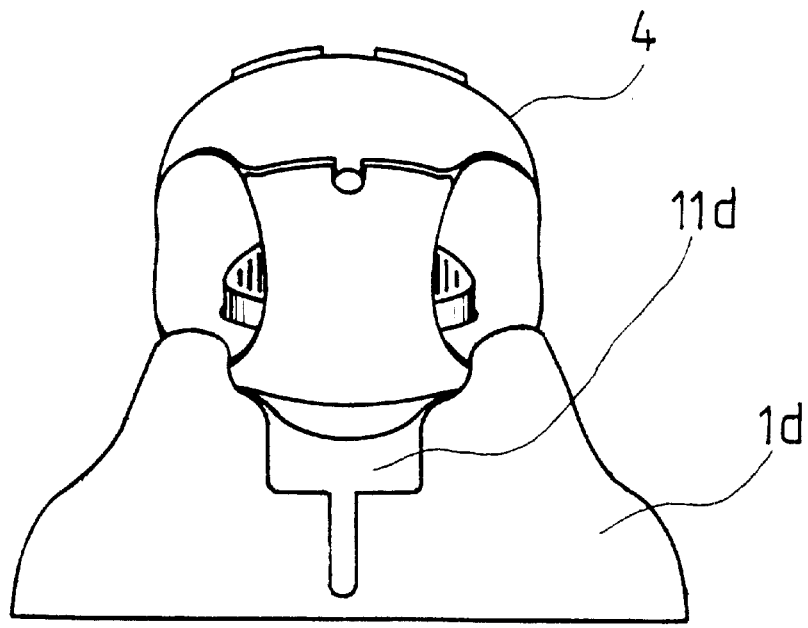
FIG. 24 is a side view of what is shown in FIG. 23.
Figure 25:
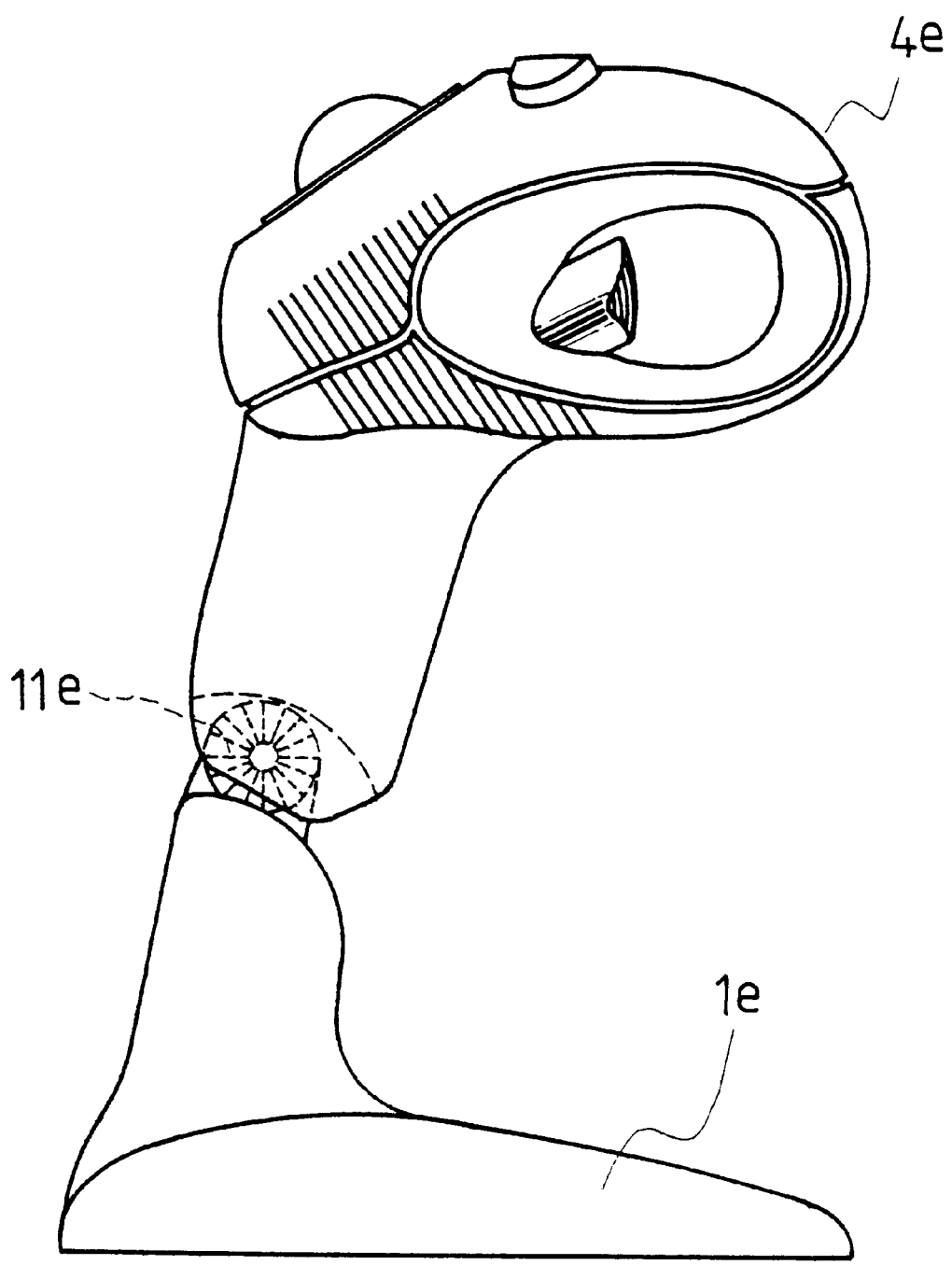
FIG. 25 is an eighth embodiment whereof the liaison mechanism is a coupling-type.

As shown in FIG. 19 and FIG. 20, on chosen locations on the outside of the casing of the hand-held electric control 4a and on the chassis 1a are provided mutually corresponding omni-directional articulation, wherein on one side is provided a circular groove 42a for coupling purposes, and on the corresponding side is provided a rotund protrusion 43a to facilitate omni-directional engagement allowing any rotational manipulation at will. As shown in FIG. 21 or FIG. 22, the coupling mode of execution is such that corresponding to the chassis 1c or hand-held electric control 4c, there may be provided a resilient coulisse 11c (41c) or rotund protrusion 43c (12c) to facilitate insert clamping leading to omni-directional engagement permitting unrestrained swinging rotations. Also, as indicated in FIG. 23 and FIG. 24, it is also possible for the chassis 1d to be a low level seat having a resilient coulisse 11d provided centrally so as to allow straight insertion of the hand-held electric control. In addition, as shown in FIG. 25, the embodiment of the chassis 1e with the hand-held electric control 4e is of an articulate assembly 11e, which is hinged so that the hand-held electric control 4e may swing about up and down freely. Similarly, the contact surfaces of the articulate assembly lie may be equipped with serrations or radial ribs to enhance swinging adjustment and orientation performance.

Figure 26:
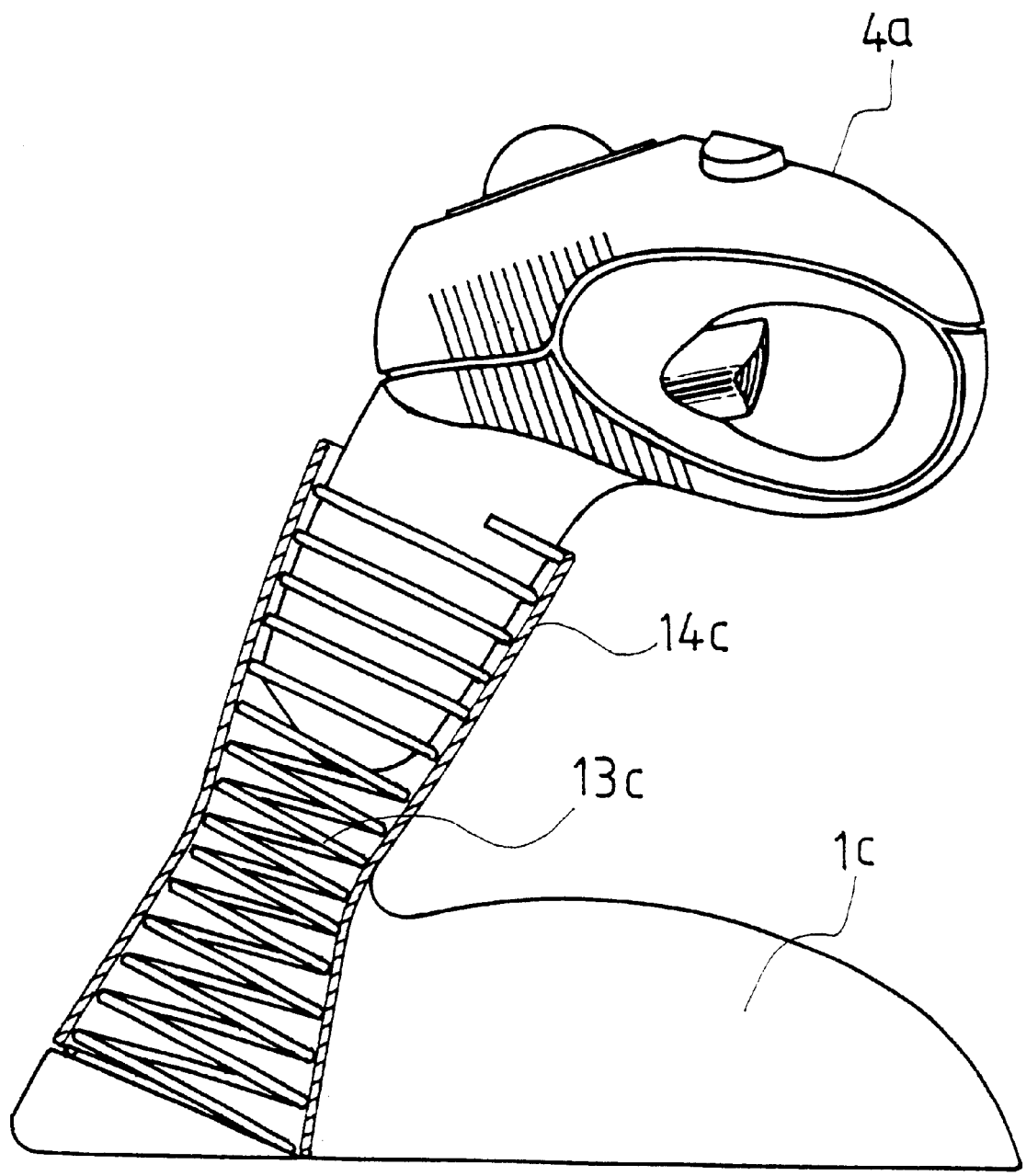
FIG. 26 is an embodiment whereof the liaison mechanism is an intromission-type.
Figure 27:
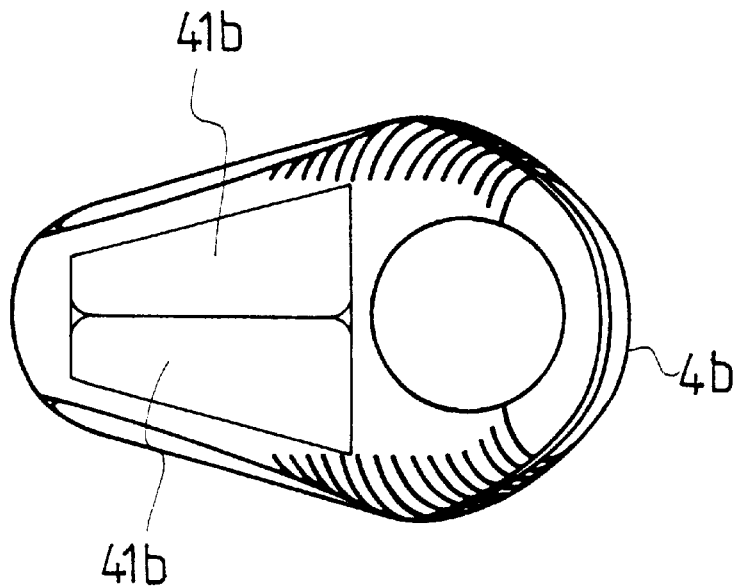
FIG. 27 is a first embodiment whereof the liaison mechanism is a folder-type.
Figure 28:
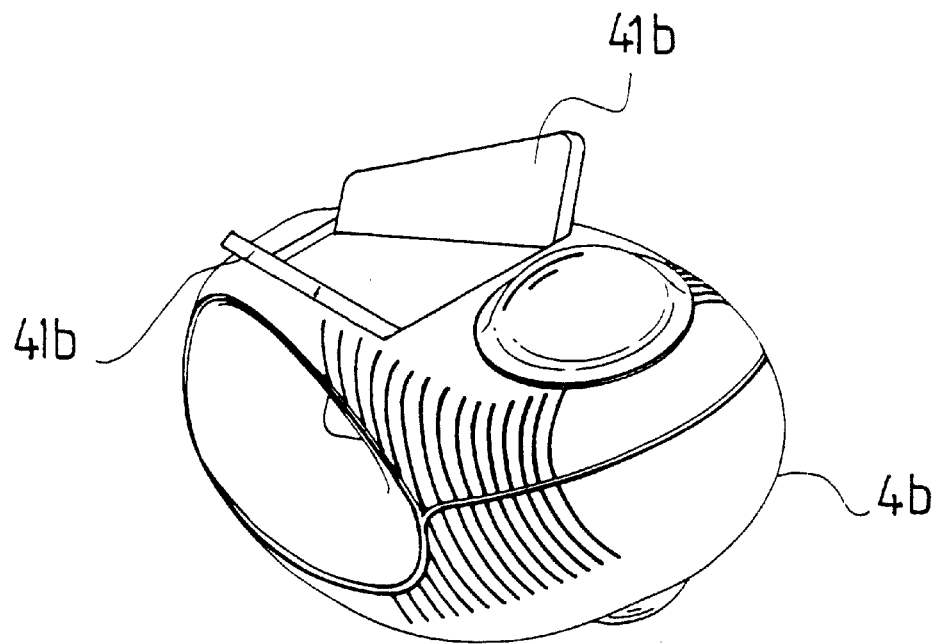
FIG. 28 shows a perspective view of FIG. 27, with open struts.
Figure 29:
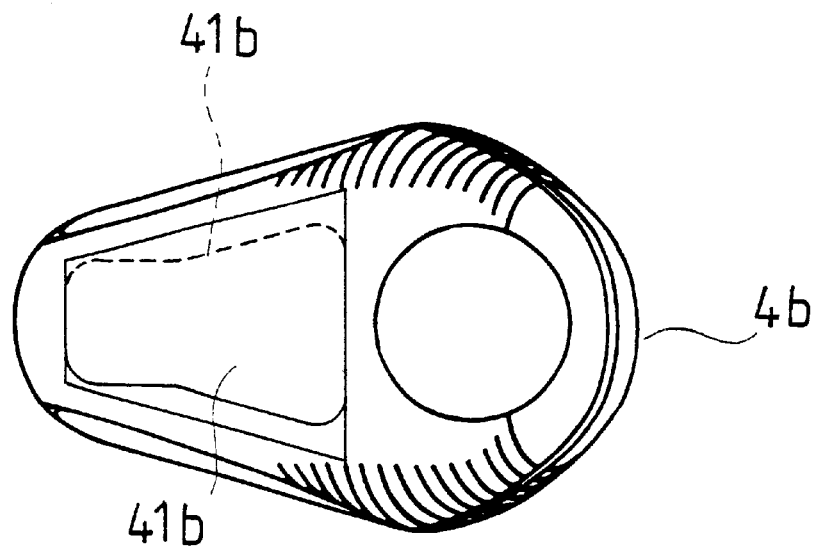
FIG. 29 is a second embodiment whereof the liaison mechanism is a folder-type.
Figure 30:
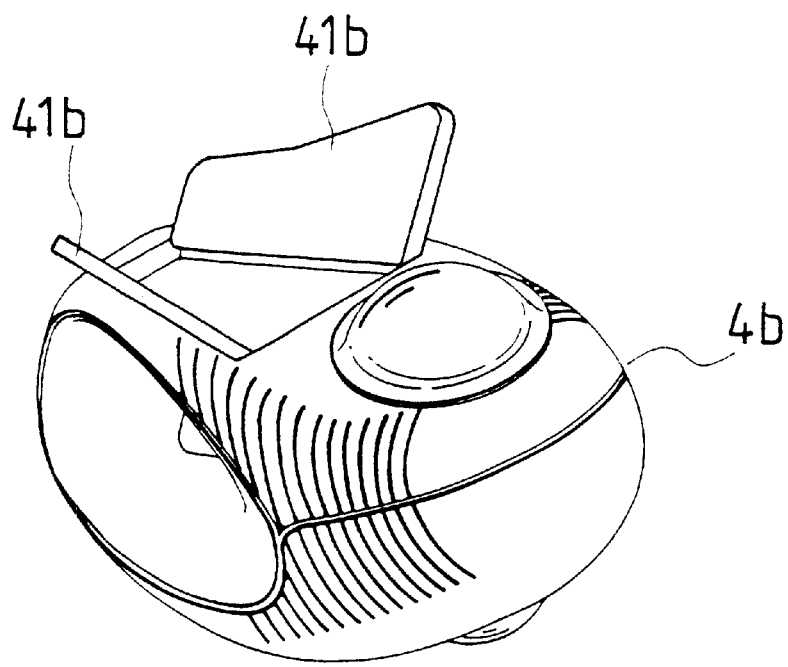
FIG. 30 illustrates a perspective view of FIG. 29 with open struts.
Figure 31:
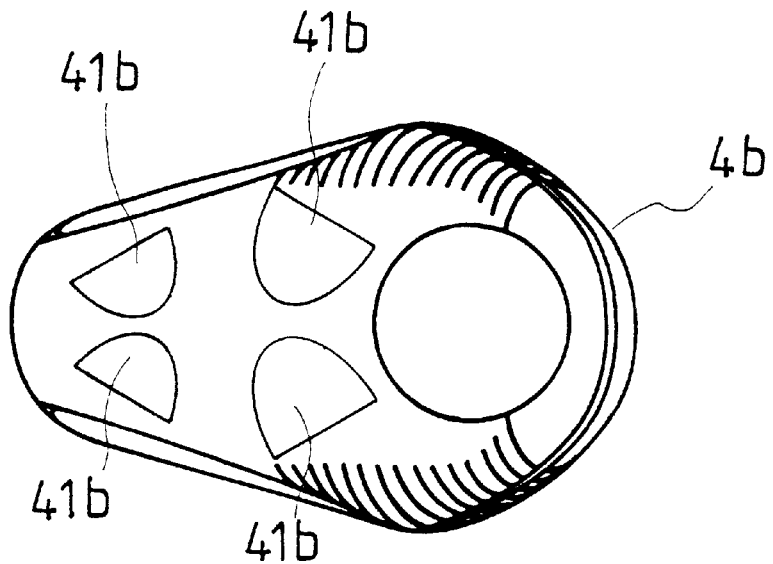
FIG. 31 is a third embodiment whereof the liaison mechanism is a folder-type.
Figure 32:
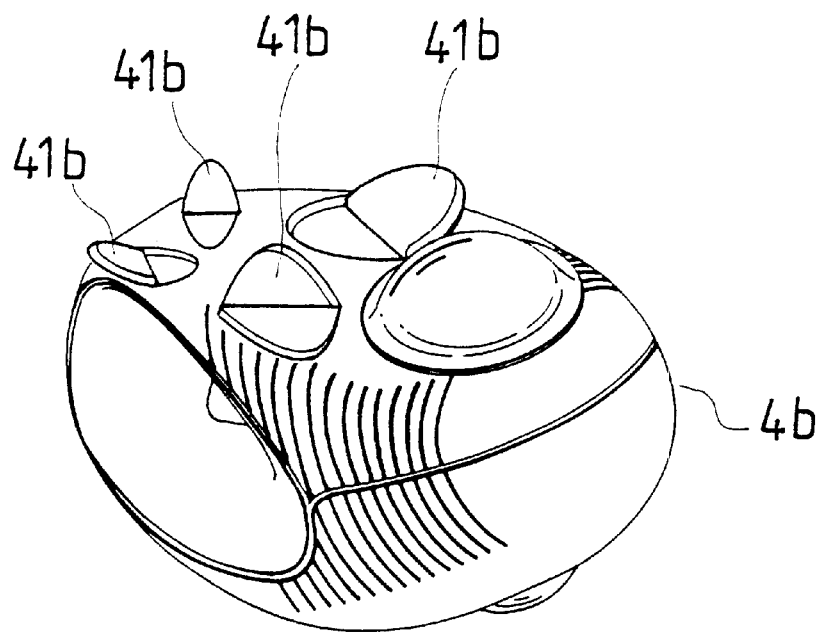
FIG. 32 shows a perspective view of FIG. 31, with open struts.
Figure 33:
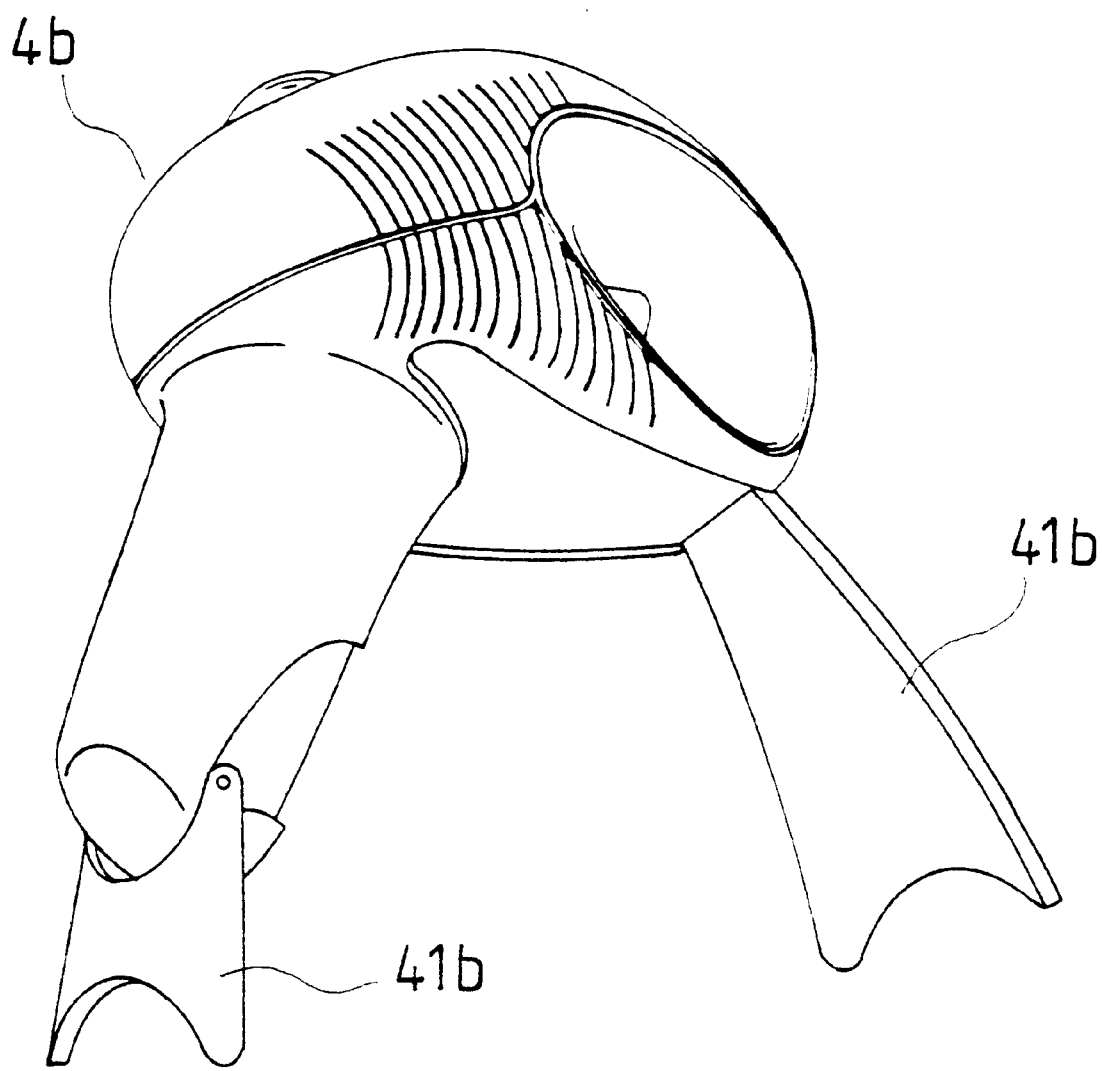
FIG. 33 is a fourth embodiment in which the liaison mechanism is a folder-type.

As shown in FIG. 26, the afore-mentioned liaison means may have one set of coil springs 13c installed on the chassis 1c, with the terminal of the spring 11 c resembling a trumpet orifice to house the hand-held electric control 4a, while the other terminal is bound to chassis 1c. Apart from being put to direct use, the spring may be surrounded with a protective covering externally or alternatively with a resilient protective coating 14c which may be applied both internally and externally so that the hand-held electric control 4a may be available for swinging around in all directions.

Figure 34:
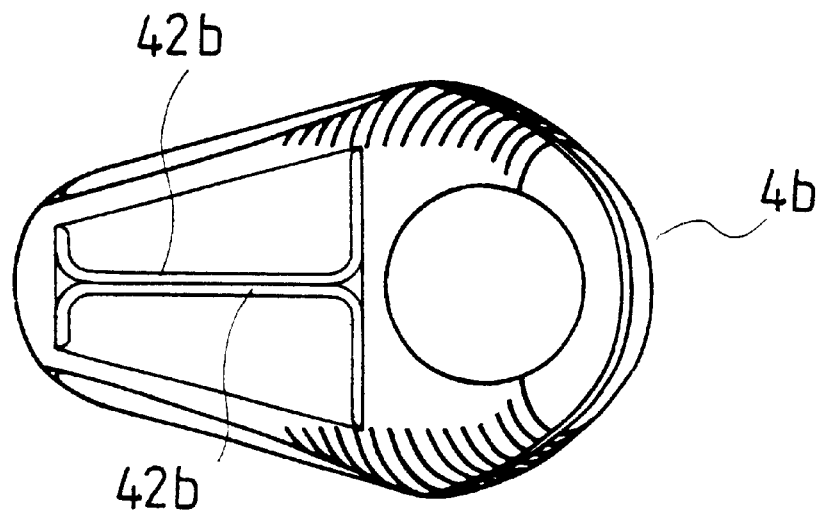
FIG. 34 is a fifth embodiment in which the liaison mechanism is a folder-type.
Figure 35:
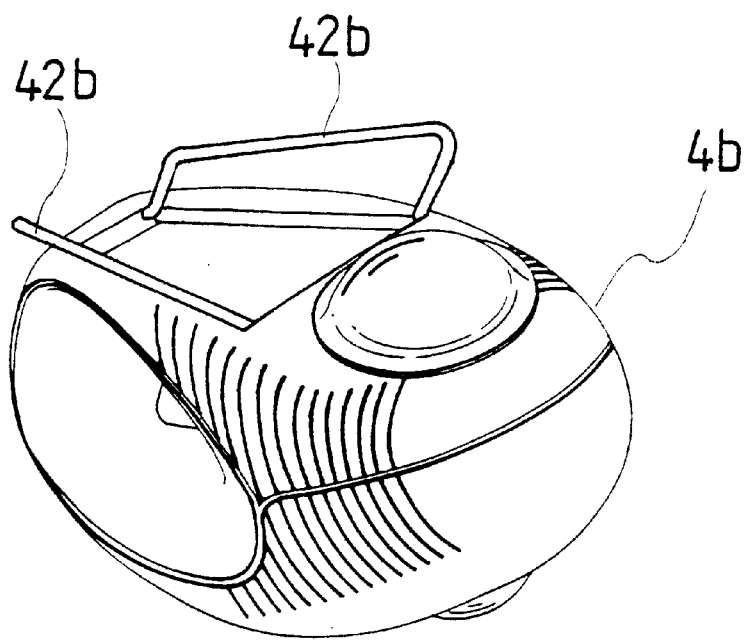
FIG. 35 illustrates a perspective view of FIG. 34 with the latice rack in an open position.
Figure 36:
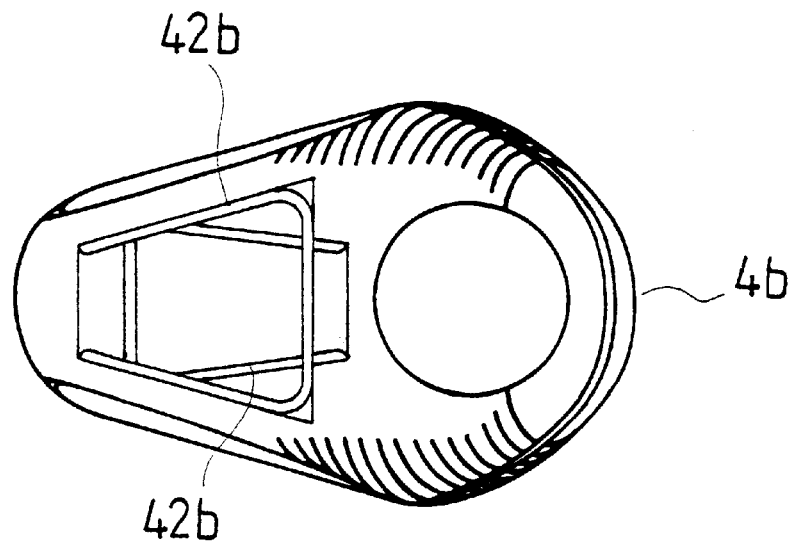
FIG. 36 is a sixth embodiment in which the liaison mechanism is a folder-type.
Figure 37:
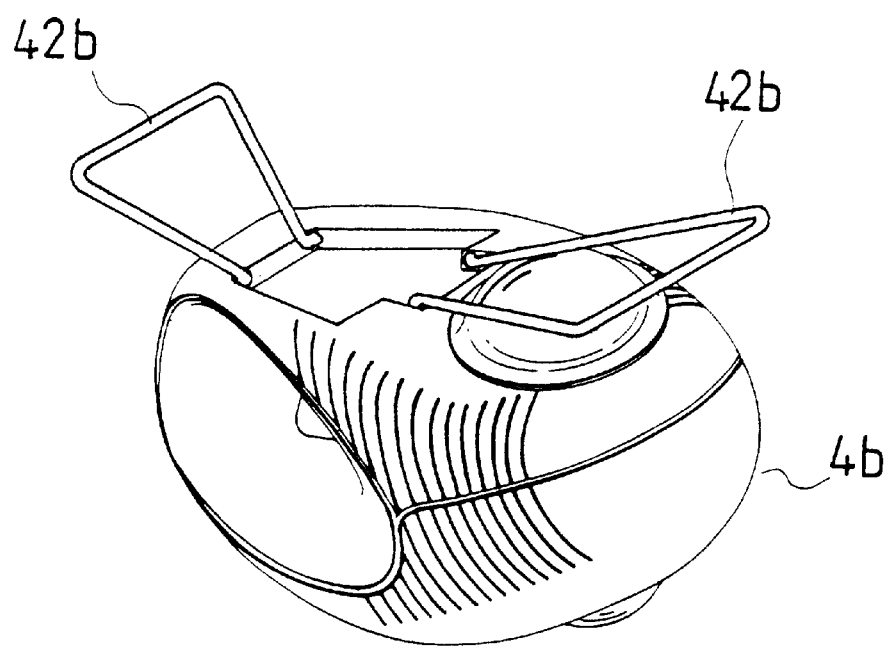
FIG. 37 illustrates a perspective view of FIG. 36 with the latice rack in an open position.
Figure 38:
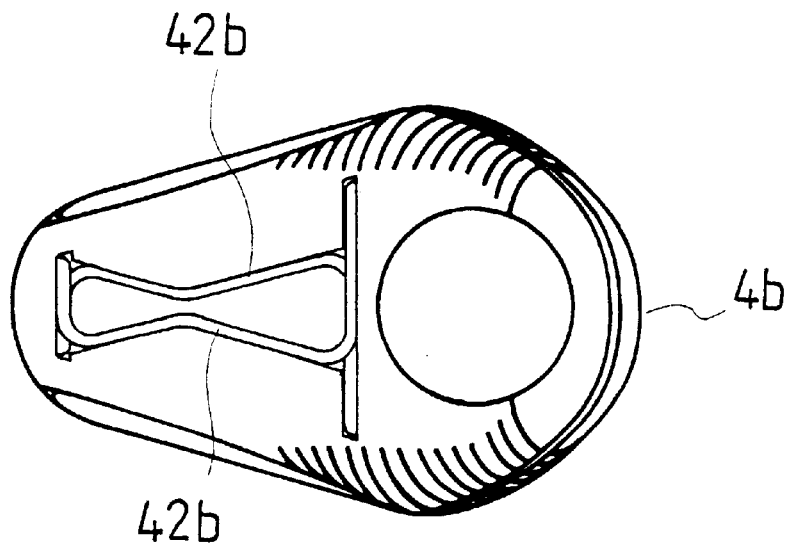
FIG. 38 is a seventh embodiment in which the liaison mechanism is a folder-type.
Figure 39:
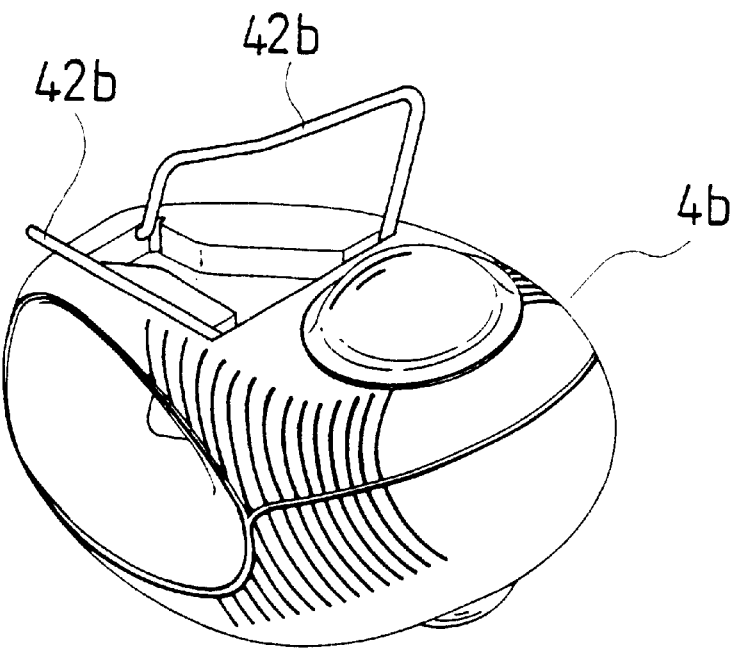
FIG. 39 illustrates a perspective view of FIG. 38 with the latice rack in an open position.
Figure 40:
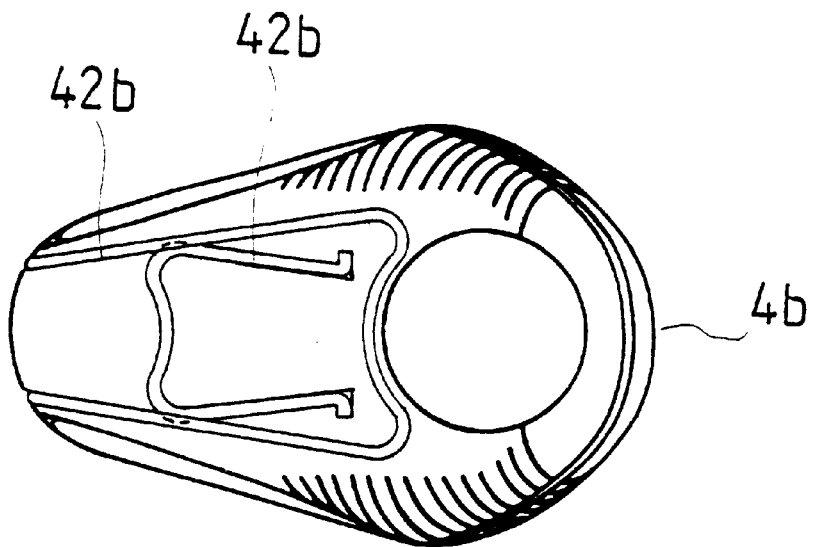
FIG. 40 is an eighth embodiment in which the liaison mechanism is a folder-type.
Figure 41:
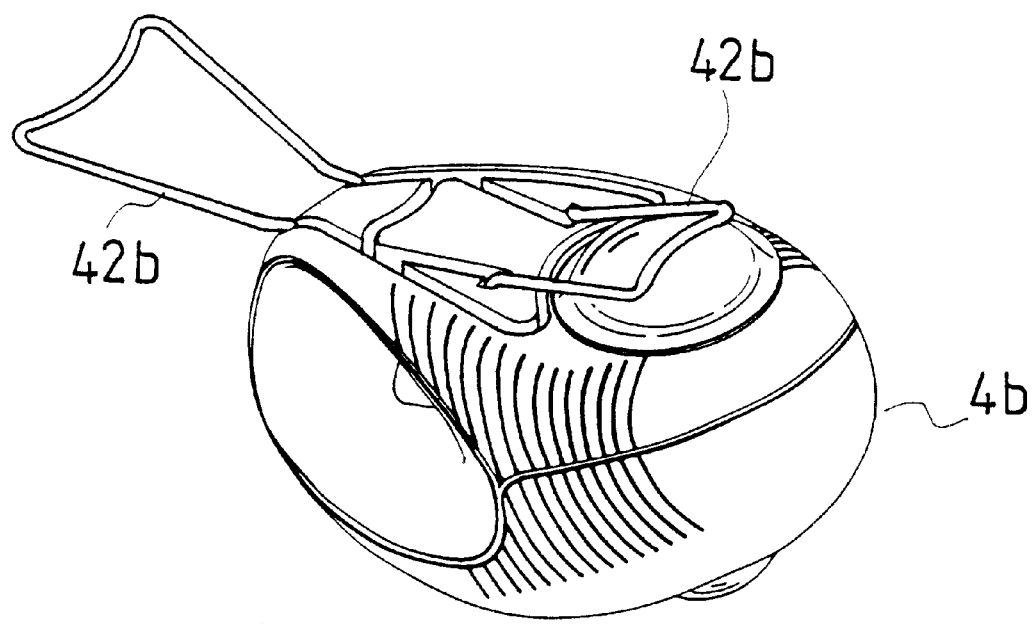
FIG. 41 illustrates a perspective view of FIG. 40 with the latice rack in an open position.
Figure 42:
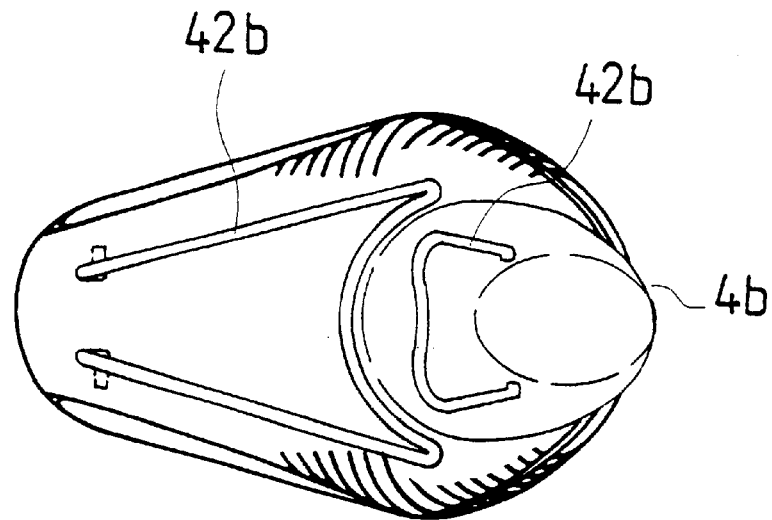
FIG. 42 is a ninth embodiment in which the liaison mechanism is a folder-type.
Figure 43:
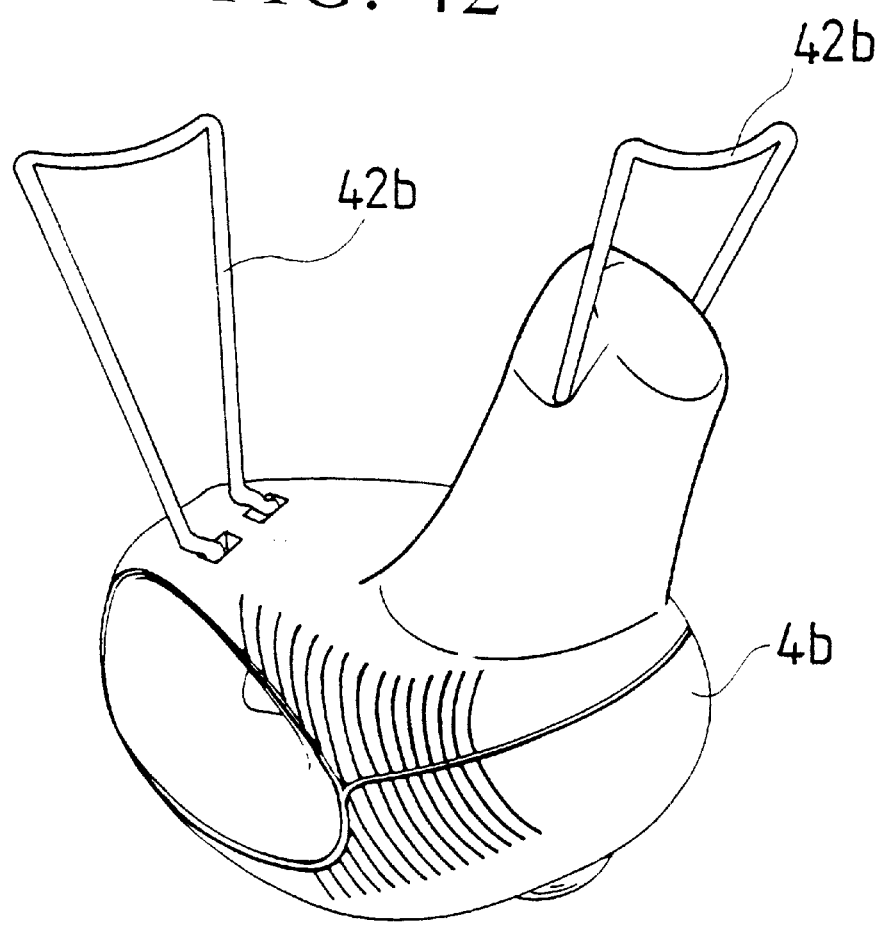
FIG. 43 illustrates a perspective view of FIG. 42 with the latice rack in an open position.

What is shown collectively in FIG. 27 through FIG. 43 is a manifold demonstration of the patterns in which a folder execution of the hand-held electric control 4b may assume; they generally provide one or more movably releasable or collapsible struts 41b, such as are shown in FIG. 27 through FIG. 33, or a lattice rack 42b, as shown in FIG. 34 and FIG. 35 between the articulation assembly and the hand-held electric control 4b about a chosen location on the casing of the hand-held electric control; the rack or strut when layed open will stand firmly in position; once closed the rack or strut will form an engaged or lapped state with the casing of the hand-held electric control 4b; and the strut 41b or rack 42b may be positioned symmetrically, laterally side by side or longitudinally, or alternatively in an unbalanced long/short pair, or both the strut or rack may be endowed with a suitable curvature so as to adhere tightly to a specific portion alongside the casing of the hand-held electric control 4b, to ease closure.

Figure 44:
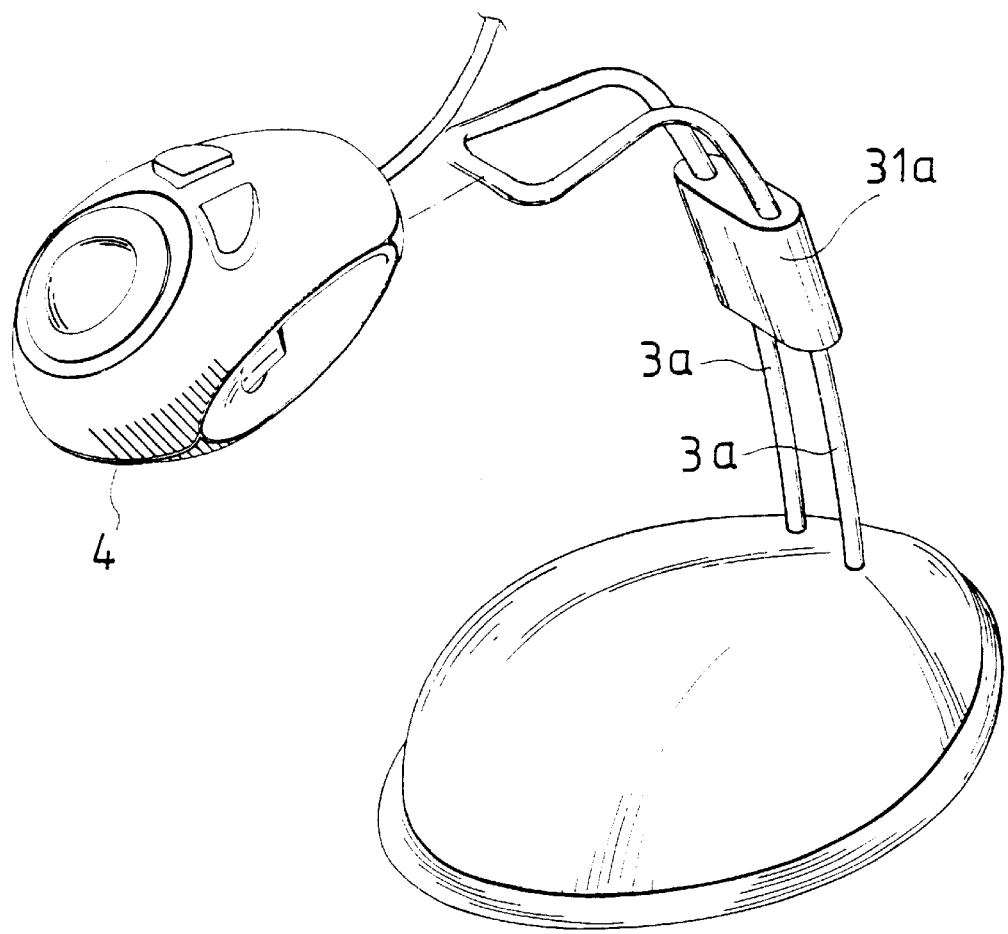
FIG. 44 is a first embodiment in which the support is an enclosed resilient pillar.
Figure 45:
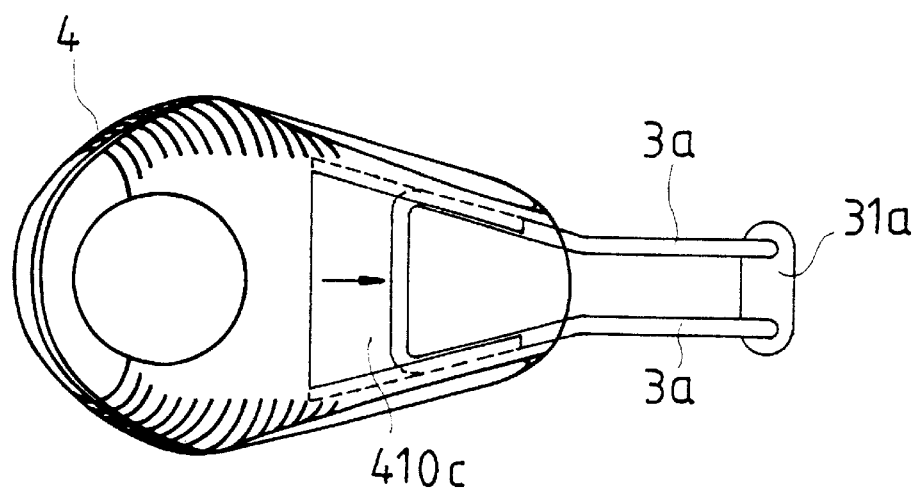
FIG. 45 shows a bottom view of the embodiment of FIG. 44.
Figure 46:
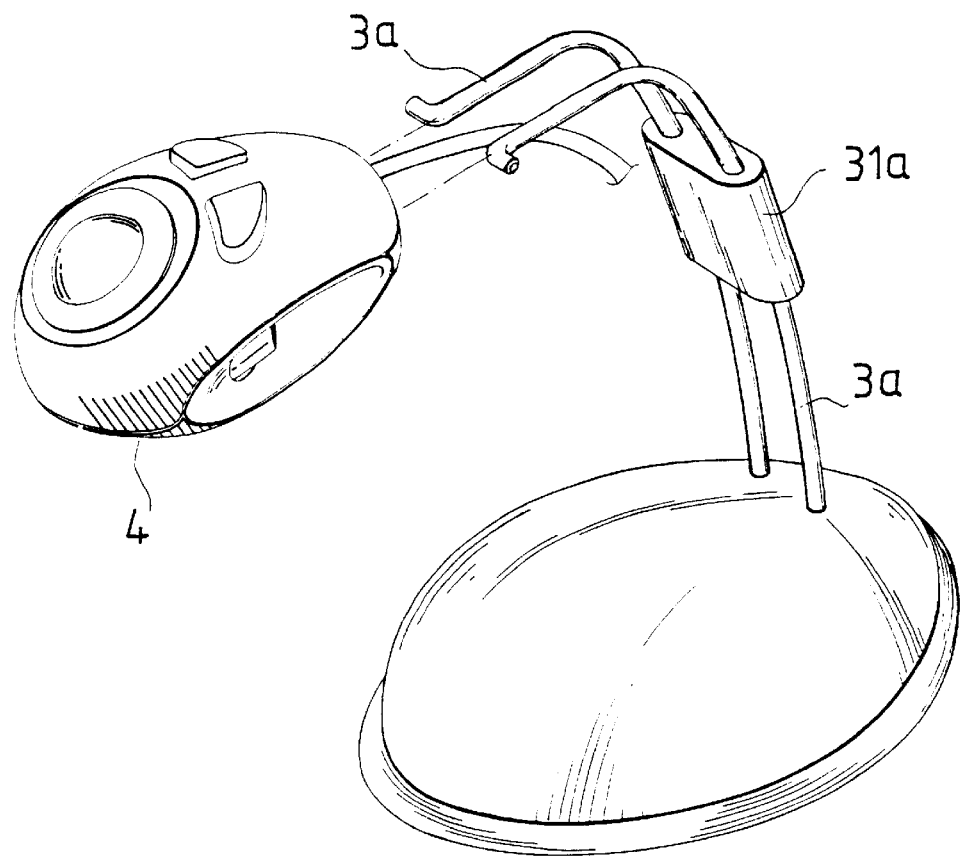
FIG. 46 is a second embodiment in which the support is an overt resilient pillar.
Figure 47:
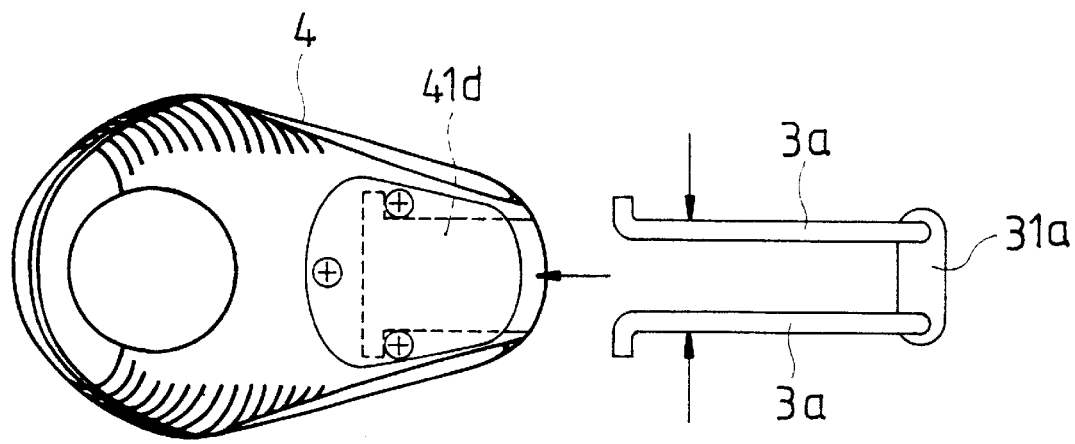
FIG. 47 is a plane view of FIG. 46.
Figure 48:
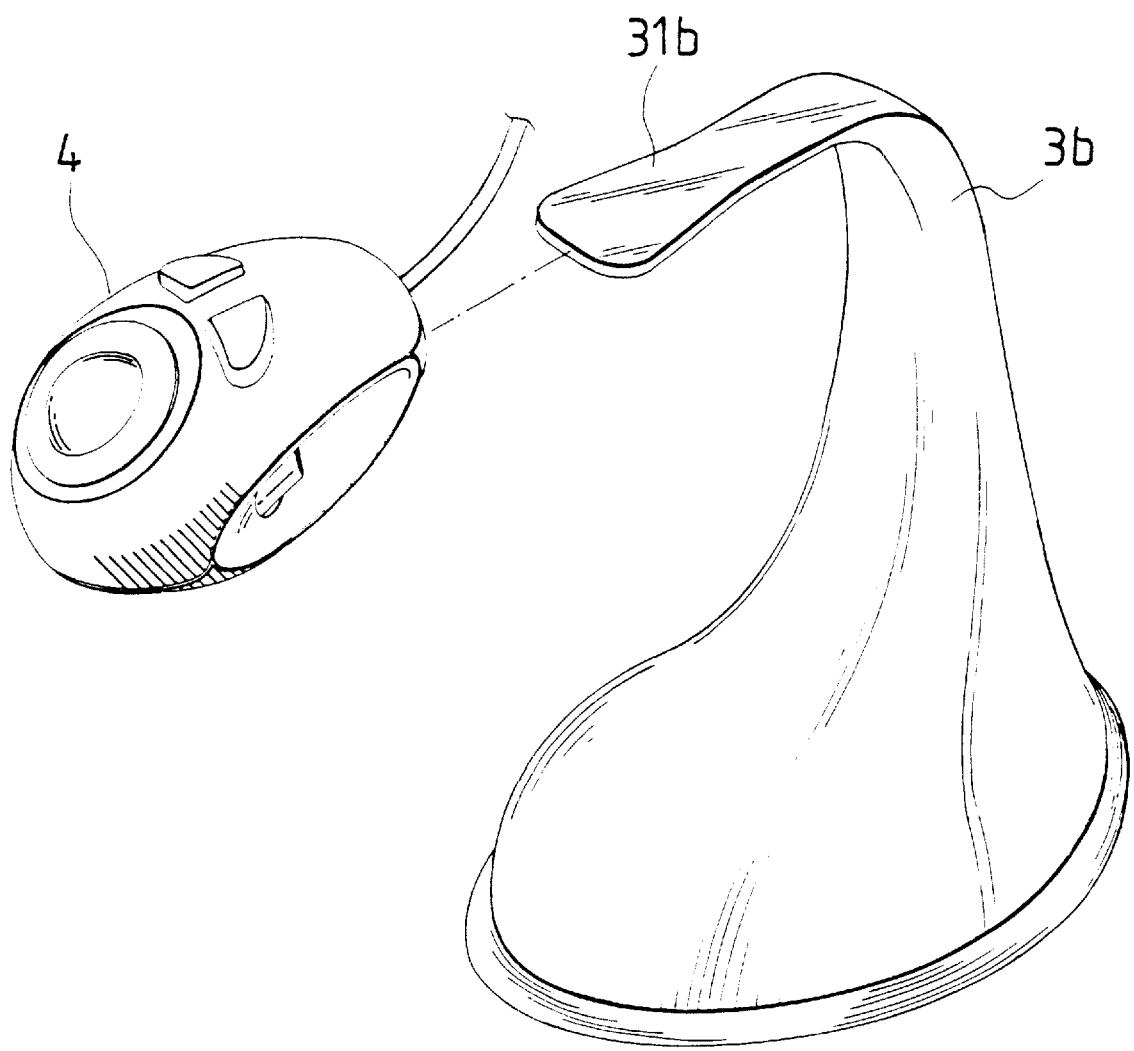
FIG. 48 is a third embodiment of the support according to the invention.

The support illustrated in FIG. 44 through FIG. 47 is exclusively for support and coupling between the hand-held electric control 4 and the chassis 1, and in the case of resilient executions, one or more resilient pillars 3a, comprising metal rods for example, may be installed on a chosen portion of the chassis 1, and a movable sleeving 31a may be applied between both resilient pillars 3a so as to ensure interactive resilience and positioning effects between the resilient pillars 3a, and it is permissible to make adjustments; the frontal tip of the resilient pillar 3a may include a larger taper profile for coupling with the dovetail coulisse 410c (of FIG. 45) on the part of the hand-held electric control 4 profiled in total contrast thereto, to allow for contrasting pulling to close or slack out, as would be better appreciated by referring to FIG. 44 and FIG. 45 at the same time; alternatively, an end may take an outwardly splayed non-closure profile to house a T-shaped cavity 41d opposing the hand-held electric control to exercise resiliently outwardly, enhancing the attachment positioning functions, as demonstrated in FIG. 46 and FIG. 47, in other words, the T-shaped cavity 41d is provided on the terminal end of the hand-held electric control 4 and will allow insertion of the outwardly bent forward portion of the resilient pillar 3a to rest in position. In addition, as shown in FIG. 48, the resilient pillar 3b is made of resilient materials such as plastics or similar substances or those which will maintain form and be stable once bent at will, thus it is possible to have a rigid dovetail plank 31b with a wider closing portion ahead of the resilient pillar 3b, so that once, it is introduced into the dovetail coulisse 410c, wedge shaped, on the end of the hand-held electric control, a perfect matching position is possible.

Figure 49:
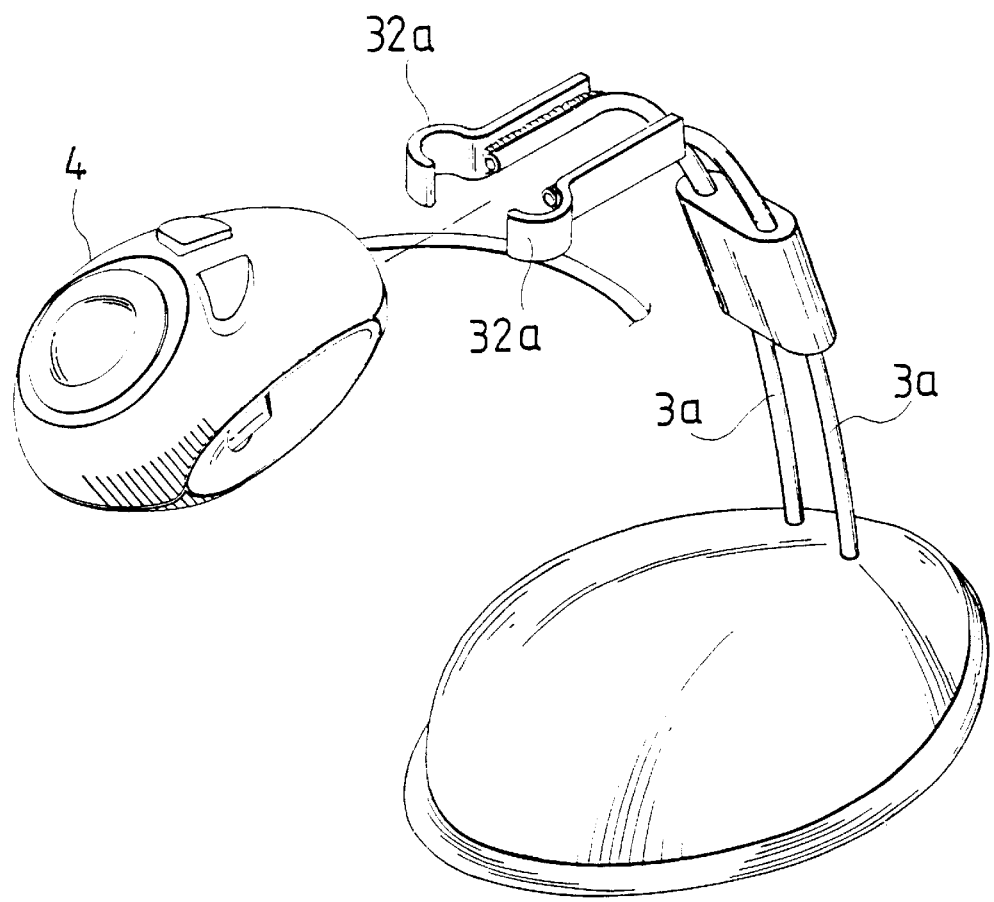
FIG. 49 is a fourth embodiment of the support according to the invention.
Figure 50:
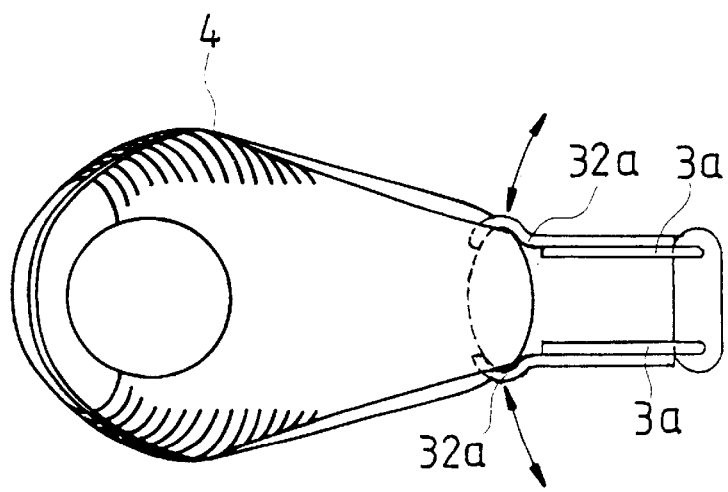
FIG. 50 is a plane view of what is shown in FIG. 49.

Referring to FIG. 49 and FIG. 50, it will be appreciated that in a support defined in the foregoing in clip-on executions, by providing a clamping element 32a onto the terminating end of afore-mentioned resilient pillar 3a, the clamping effect can bring the hand-held electric control 4 to a clamped position.

Figure 51:
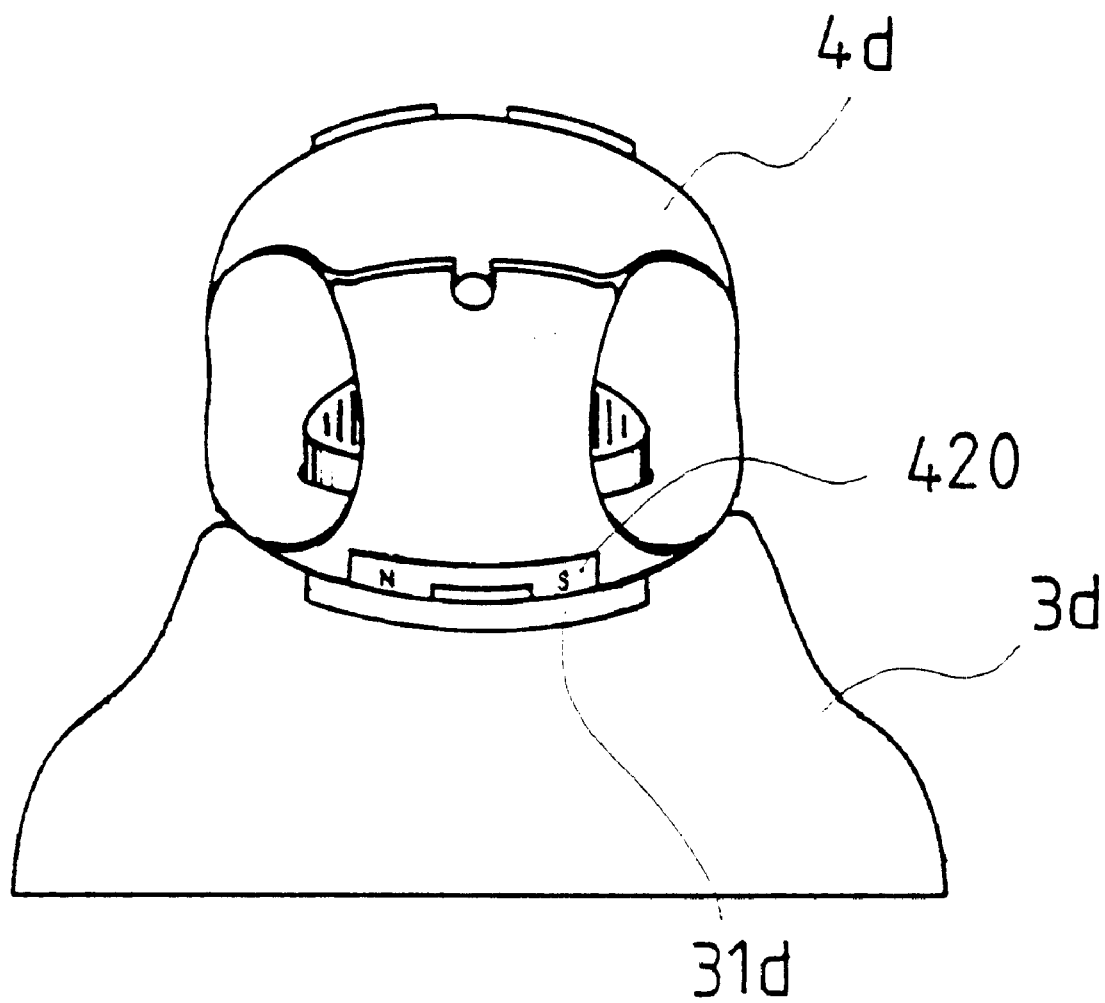
FIG. 51 is an embodiment in which the liaison mechanism is a suction magnet.

FIG. 51 illustrates the afore-mentioned support via a magnet suction execution whereof chosen locations on the part of both the support 3d and the hand-held electric control 4d are arranged with magnets and magnetic field circuits corresponding thereto (unlike polarities forming polar couplets), whereby the magnets 31d, 420 and magnetic field circuits or polar couplets are composed of antagonistic polarities by virtue of their resulting attraction that serve to attract the hand-held electric control 4 to the support, that is, the supporting structure.

Figure 52:
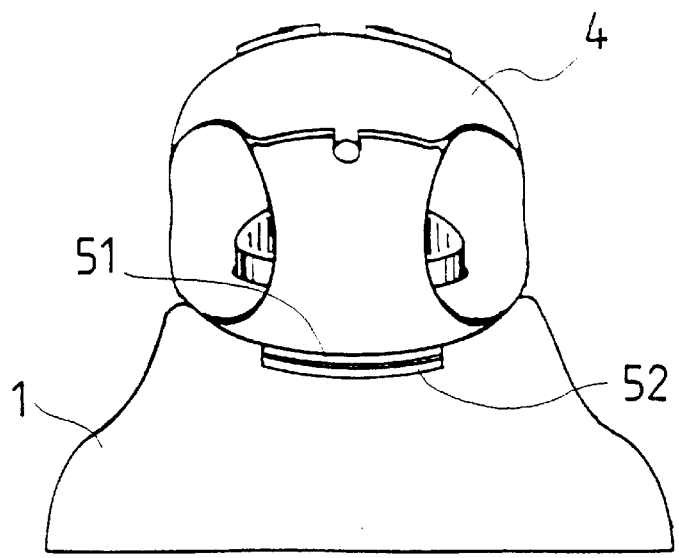
FIG. 52 is an embodiment in which the liaison mechanism is a lacing bond.
Figure 53:
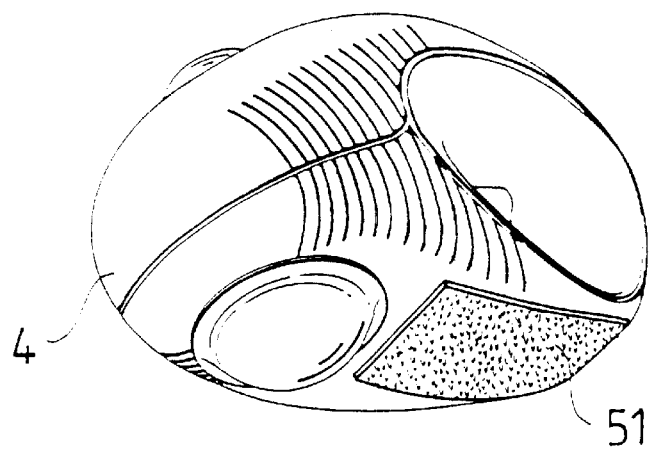
FIG. 53 is a three-dimensional illustration of the hand-held electric control of FIG. 52.

FIG. 52 and FIG. 53 illustrate the inventive support executed in the form of lacing bondage whereby male and female lacings also know as a hook and loop fastener (available under the trademark VELCRO) 51, 52 are attached on chosen quarters on the hand-held electric control 4 and on the chassis 1, so that they will detachably stick to each other.

Basing ergonomic considerations, the inventive hand-held electrically controlled desktop structure may be enhanced with reference to illustrations given from FIG. 1 through FIG. 53 such that:

1. A tilt is allowed between the tangential side of the chassis and the vertical axial line thereof, or alternatively both are the tangential side and the vertical axial line may be treated as being vertical so as to provide a comfortable angle to the when in accessing the hand-held electric control;
2. The liaison means or device is separate from or integral with the hand-held electric control, and in relation to the coupling face with-the hand-held electric control, it may be arranged parallel, tangential to the interface between the chassis and the desktop, or else at a slope out of the parallel interface thereof;
3. The relationship between the supporting means, of either rigid or resilient base, and the chassis in order to support and to interconnect the hand-held electric control with the chassis, is based on the interface between the desktop, which may be in parallel or at a slope out of the parallel interface thereof;
4. The interface allows the chassis to be adhered to the desktop and the interface between the hand-held electric control, as noted in 2 herein above, and the liaison means may both be fixed, restrained from free rotation, or else it may be arranged such that both or either one of the two interfaces may be adjustable for rotation.

In summary, the inventive hand-held electrically controlled desktop structure, makes it possible for manipulation of the hand-held electric control and casual deposition on the desktop without much effort in order to realize a stable positioning free from worries that the device might roll, fall down and get damaged, and with the added advantage of the ease of operation at its top, it is a substantial improvement over the prior art.

What is claimed is:

1. A hand-held electrically controlled desktop structure, comprising:

a hand-held electric control;

a chassis that is detachably fixable with a desktop;

a liaison device attached to the chassis for detachable integration with the hand-held electric control;

a supporting device comprised of a base that is either rigid or resilient, the supporting device adapted to provide support to the hand-held electric control, the supporting device adapted to unite the hand-held electric control with the chassis;

the chassis is either a suction disk, a laydown device or a locker type device;

the liaison device is a unit that is either fixed, separable, integrated, hanging, coupling, lay-in type, folder-type, clamping-type, magnetic absorption type, or hook and loop type;

wherein the hand-held electric control and the chassis are secured to each other by an articulated assembly, a spring-bound assembly, or a resilient assembly; and one or more suction disks on a bottom of the chassis, the suction disk can stick to any smooth object, the chassis comprises any suitably rigid or flexible base materials or a combination of both rigid and materials in order to permit a steady and stable layout, or to permit direct locking to any suitable attachments on the desktop; the supporting device for the chassis comprising one or more resilient pillars with two adjacent ones of the resilient pillars interposed with a rotationally movable sleeving there-between so that the resilient pillars can be pulled or pushed to a desirable length.

2. A hand-held electrically controlled desktop structure, comprising:

a hand-held electric control;

a chassis that is detachably fixable with a desktop;

a liaison device attached to the chassis for detachable integration with the hand-held electric control;

a supporting device comprised of a base that is either rigid or resilient, the supporting device adapted to provide support to the hand-held electric control, the supporting device adapted to unite the hand-held electric control with the chassis;

the chassis is either a suction disk, a laydown device or a locker type device;

the liaison device is a unit that is either fixed, separable, integrated, hanging, coupling, lay-in type, folder-type, clamping-type, magnetic absorption type, or hook and loop type;

wherein the hand-held electric control and the chassis are secured to each other by an articulated assembly, a spring-bound assembly, or a resilient assembly; and a correlated coupling between an extension plank that is part of the hand-held electric control and a resilient coulisse of the chassis; contact surfaces between the coulisse and the extension plank are provided with serrations to provide improved grip therebetween.

3. A hand-held electrically controlled desktop structure, comprising:

a hand-held electric control;

a chassis that is detachably fixable with a desktop;

a liaison device attached to the chassis for detachable integration with the hand-held electric control;

a supporting device comprised of a base that is either rigid or resilient, the supporting device adapted to provide support to the hand-held electric control, the supporting device adapted to unite the hand-held electric control with the chassis;

the chassis is either a suction disk, a laydown device or a locker type device;

the liaison device is a unit that is either fixed, separable, integrated, hanging, coupling, lay-in type, folder-type, clamping-type, magnetic absorption type, or hook and loop type;

wherein the hand-held electric control and the chassis are secured to each other by an articulated assembly, a spring-bound assembly, or a resilient assembly; and generally one or more movably releasable or collapsible struts or lattice rack between an articulation assembly and the hand-held electric control by about a chosen location on the casing of the hand-held electric control, the rack or the strut when spread open will stand firmly in position and upon closure the rack or strut will form an engaged or lapped state with respect to the casing of the hand-held electric control, and the strut or rack is symmetrically positionable, laterally side by side or longitudinally in an unbalanced long/short pair, or is provided with a suitable curvature so as to adhere tightly to the casing of the hand-held electric control.

4. A hand-held electrically controlled desktop structure, comprising:

a hand-held electric control;

a chassis that is detachably fixable with a desktop;

a liaison device attached to the chassis for detachable integration with the hand-held electric control;

a supporting device comprised of a base that is either rigid or resilient, the supporting device adapted to provide support to the hand-held electric control, the supporting device adapted to unite the hand-held electric control with the chassis;

the chassis is either a suction disk, a laydown device or a locker type device;

the liaison device is a unit that is either fixed, separable, integrated, hanging, coupling, lay-in type, folder-type, clamping-type, magnetic absorption type, or hook and loop type;

wherein the hand-held electric control and the chassis are secured to each other by an articulated assembly, a spring-bound assembly, or a resilient assembly; and one or more resilient pillars installed on a chosen portion of the chassis and a movable sleeving applied between both the resilient pillars so as to permit interactive resilience and positioning effects between the resilient pillars; a frontal tip of the resilient pillars include a larger tapered profile such as a dovetail mortise grooving of the hand-held electric control, to allow for pulling or slack out, or alternatively wherein an end therof may take a profile to house a T-shaped cavity opposite the hand-held electric control to permit resiliently and outwardly expanding hooking positioning functions, such that, the T-shaped cavity provided on the terminal end of the hand-held electric control will allow insertion of the outwardly bent forward portion of the resilient pillar to rest in position.

* * * * *